(12) United States Patent
Sudou

(10) Patent No.: US 8,786,980 B2
(45) Date of Patent: Jul. 22, 2014

(54) MAGNETIC TAPE LIBRARY DEVICE INCLUDING CARTRIDGE EXCHANGE NUMBER RESTRICTION MECHANISM

(71) Applicant: Shinichi Sudou, Tokyo (JP)

(72) Inventor: Shinichi Sudou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/745,581

(22) Filed: Jan. 18, 2013

(65) Prior Publication Data

US 2013/0189056 A1 Jul. 25, 2013

(30) Foreign Application Priority Data

Jan. 20, 2012 (JP) ................ 2012-010038

(51) Int. Cl.
*G11B 15/68* (2006.01)
(52) U.S. Cl.
USPC ....................................... 360/92.1
(58) Field of Classification Search
USPC ............. 360/92.1, 98.06; 369/30.42, 30.49
See application file for complete search history.

(56) References Cited

U.S. PATENT DOCUMENTS

| | | | | |
|---|---|---|---|---|
| 6,956,714 B2 * | 10/2005 | Oohara et al. | ............ | 360/92.1 |
| 8,046,099 B2 * | 10/2011 | Ishitsuka | .............. | 700/214 |
| 8,059,363 B2 | 11/2011 | Suzuki et al. | | |
| 8,254,217 B2 * | 8/2012 | Kawasaki | ............ | 369/30.34 |
| 8,456,777 B2 * | 6/2013 | Ishii | .............. | 360/92.1 |
| 8,582,401 B2 * | 11/2013 | Kawasaki et al. | ........... | 369/30.48 |
| 2008/0282275 A1 * | 11/2008 | Zaczek et al. | ............ | 720/632 |
| 2009/0083773 A1 * | 3/2009 | Hoelsaeter et al. | ......... | 720/646 |
| 2011/0194386 A1 * | 8/2011 | Ishii | ............ | 369/30.43 |
| 2012/0250182 A1 * | 10/2012 | Makino | ............ | 360/92.1 |
| 2012/0286633 A1 * | 11/2012 | Hashimoto | ............ | 312/215 |

FOREIGN PATENT DOCUMENTS

JP 2009-230839 A 10/2009

* cited by examiner

*Primary Examiner* — Jefferson Evans
(74) *Attorney, Agent, or Firm* — McGinn IP Law Group, PLLC

(57) ABSTRACT

To provide a magnetic tape library device capable of easily exchanging a specific cartridge required to be exchanged under the mailslot function and shortening the time for inventory with a simple structure even with the magazine where a plurality of stages of cells for housing the magnetic tape cartridges inside thereof are loaded. The magnetic tape library device includes: a magazine which houses cartridges via a plurality of stacked cells; a device main body which houses the magazine to be freely movable; an accessor which transports the magnetic tape cartridge extracted from the magazine towards a magnetic tape drive; and a cartridge exchange number restricting mechanism which restricts the magnetic tape cartridges from being ejected out from remaining cells except for the cell where at least a specific magnetic tape cartridge is housed out of the plurality of cells on the very front row of the drawn out magazine.

7 Claims, 29 Drawing Sheets

MAGNETIC TAPE LIBRARY DEVICE INCLUDING CARTRIDGE EXCHANGE NUMBER RESTRICTION MECHANISM

CROSS-REFERENCE TO RELATED APPLICATION

This application is based upon and claims the benefit of priority from Japanese patent application No. 2012-010038, filed on Jan. 20, 2012, the disclosure of which is incorporated herein in its entirety by reference.

BACKGROUND OF THE INVENTION

1. Field of the Invention

The present invention relates to a magnetic tape library device. More specifically, the present invention relates to a magnetic tape library device which includes a plurality of magnetic tape cartridges (simply referred to as cartridges hereinafter), a magnetic tape drive, an accessor for executing transportation of the cartridges mutually, and a cartridge housing shelf (simply referred to as a magazine hereinafter) that is detachable from a device main body, with which the number of rolls of exchangeable cartridges at the time of mailslot can be made appropriate through restricting the number of exchangeable cartridges of the magazine only at the time of mailslot.

2. Description of the Related Art

Conventionally, it is common to draw out the entire magazine from the device main body, and to extract a cartridge from a desired cell to exchange the cartridge when exchanging the cartridges housed, respectively, in multiple numbers of cells within the magazine.

However, when a specific cartridge of a particularly high use frequency is housed in a cell on the front-row side of the magazine drawing direction, for example, it is possible to exchange the cartridge with less effort by drawing out only the front row instead of drawing out the entire magazine and exchanging the specific cartridge at that position.

Further, as a device developed for such case, there is known a magnetic tape library device provided with a mailslot mechanism that makes it possible to exchange only a specific cartridge (see Japanese Unexamined Patent Publication 2009-230839 (Patent Document 1), for example). That is, the library device disclosed in Patent Document 1 is in the structure as shown in FIGS. 24 to 29.

FIG. 24 is an overall perspective view of a state where a magazine is partially drawn from a casing at the time of the mailslot function.

As shown in FIG. 24, a library device 100 is structured to be able to insert/extract a magazine 102 to/from a casing 101.

An accessor 103 is disposed on one of the sides of the place where the magazine 102 is disposed.

The accessor 103 can move reciprocally along the inserting/extracting direction M of the magazine 102.

Further, the accessor 103 is designed to extract, to house, and to move (transport the cartridge) the cartridge according to control signals inputted from a controller 105.

Further, regarding the accessor 103, a moving range H1 under a magazine extraction restricting operation is set on an extended line of a moving range H of normal operations (extracting and housing the cartridge from/to the magazine 102, setting and detaching the cartridge to/from the magnetic tape drive 104).

The magazine extraction restricting action will be described in details in a later part.

Next, the structure of the magazine 102 will be shown based on FIG. 25. FIG. 25 is a perspective view showing the bottom face of the magazine 102.

Inside the magazine 102 is sectioned into a plurality of cells $102a01$ to $102a04$ which are housing chambers of the cartridges (not shown). Further, as described above, the cartridges can be housed in each of the cells $102a01$ to $102a04$.

In a bottom face $102c$ of the magazine 102, a guide rail $102d$ is placed substantially in parallel to the inserting/extracting direction M (see FIG. 24). On the side face (on the center right side of FIG. 25) on the side closer to the accessor 103 (see FIG. 24) of the guide rail $102d$, a first step $102e01$, a second step $102e02$, and a third step $102e03$, for example, are formed.

FIG. 26 shows the structure of the front part of the casing 101.

That is, in a magazine housing section $101a$ that houses the magazine 102, a lock lever 106 and a rail 113 are placed. The lock lever 106 is placed in the casing 101 via a lock lever attaching shaft 112. Further, the lock lever 106 is rotatable within a parallel plane that is substantially the same as a bottom face $101b$ of the casing 101.

The lock lever 106 is placed in such a manner that a part thereof comes between the casing 101 and the bottom face $102c$ of the magazine 102 when the magazine 102 is being housed.

Hereinafter, the part of the lock lever 106 disposed in the gap between the bottom face $102c$ of the magazine 102 and the casing 101 when the magazine is being housed is referred to as an engagement part.

Further, a part of the lock lever 106 is disposed to locate on the running path of the accessor 103. Torque is generated when the accessor 103 abuts against the part of the lock lever 106, and the lock lever 106 is rotated by having the lock lever attaching shaft 112 as an axle.

Further, a lock lever spring 111 is attached to the lock lever 106. Thereby, the engaging part is energized towards the rail 113 side.

It is so designed that the first step $102e01$ and the lock lever 106 are engaged at the position where the one row of the cell section 102A of the magazine 102 is drawn out from the casing 101 under such state, so that only the very front cell ($102a01$) of the cell section 102A inside the magazine 102 can be drawn out to the position exposed to the outside of the casing 101.

Hereinafter, the action of drawing out the magazine 102 from the casing 101 in the library device 100 (the magazine extraction restriction release operation) will be described.

As shown in FIGS. 27A and 27B, when the accessor 103 is brought forward along the inserting/extracting direction M from the state where the magazine 102 is housed in the casing 101, the accessor 103 pushes a part of the lock lever 106 and overpowers the elastic force of the lock lever spring 111 to rotate the lock lever 106 as shown in FIG. 28.

When the magazine 102 is dawn out from the casing 101 by hand under such state, the magazine 102 can be stopped in a state where the one row in the very front cells of the cell section is being drawn out from the device front face.

This provides a state (referred to as mailslot) where the user can exchange only the cartridge containing a limited cell within the magazine 102, i.e., a specific cell ($102a01$), so that it is effective when the user wishes to exchange a small amount of cartridge.

That is, only the specific cartridge is exchanged, so that required is only a small amount of action (referred to as inventory hereinafter) while saving actions for recognizing all the cartridges loaded on the device side. This results in shortening the time for the inventory.

When the accessor 103 is further brought forward to rotate the lock lever 106 further by overpowering the elastic force of the lock lever spring 111, the engaging part is not engaged with all the steps on the guide rail 102d, i.e., the first to third steps 102e01, 102e02, and 102e03, as shown in FIG. 29. Under such state, the entire magazine 102 can be drawn out from the casing 101 completely.

Recently, high-density packaging of the cartridges is making progress. For example, it has come to use a magnetic tape library device that employs a 2U magazine in which a large number of cartridges are mounted by connecting two units in the inserting/extracting direction and loading cartridges in a plurality of stages along the height direction of the respective units.

With such magnetic tape library device, there is also a case where it is required to perform the mailslot function described above.

However, when a cartridge is to be exchanged by employing the mailslot function disclosed in the magnetic tape library device disclosed in Patent Document 1 described above to the magazine such as the 2U magazine where a plurality of stages such as three stages of cartridges are loaded in the height direction, three cartridges are stacked vertically in one line in the cell of the front row of the cell section extracted out from the front face of the device main body in the case of the 2U magazine or the like when the magazine is drawn out from the device main body to the mailslot position.

Thus, all of those cartridges become exchangeable, so that those other than the required cartridge can also be in an exchangeable state. Therefore, a large number of the cartridges other than the cartridge designated by the user are in an exchangeable state, so that the user needs to go through a trouble of finding the cartridge to be exchanged.

Further, it is not supposed to do inventory for the cartridges that are not exchanged. However, it becomes necessary to do the inventory for all the cartridges that are in an exchangeable state in terms of the function at the time of the mailslot function. Therefore, the time for the inventory after stopping the employment of the mailslot function is extended, which results in deterioration of the performance.

An exemplary object of the present invention is to provide a magnetic tape library device which can easily extract and exchange a specific cartridge required to be exchanged at the time of the mailslot function and can shorten the time for inventory with a simple structure even with the magazine in the structure where a plurality of stages of cells for housing the magnetic tape cartridges inside thereof are loaded.

SUMMARY OF THE INVENTION

In order to achieve the foregoing object, the magnetic tape library device according to an exemplary aspect of the invention is characterized to include: a magazine which houses a magnetic tape cartridge inside thereof via a cell; a device main body which houses the magazine in a freely movable manner within a same plane along an inserting/extracting direction; and an accessor provided on one side of the device main body along the inserting/extracting direction, which transports the magnetic tape cartridge extracted from the magazine along the inserting/extracting direction and towards the magnetic tape drive, wherein: a plurality of the cells are provided inside the magazine in a plurality of rows along the inserting/extracting and on a plurality of stages in a height direction in a stacked manner; and a cartridge exchange number restricting mechanism is provided for restricting the magnetic tape cartridges from being ejected out from remaining cells except for the cell where at least a specific magnetic tape cartridge is housed out of the plurality of cells under a state where the magazine is being drawn out so that the plurality of cells on a front-side drawer end part in the inserting/extracting direction out of the plurality of cells are outside of the device main body.

BRIEF DESCRIPTION OF THE DRAWINGS

FIGS. 22A and 22B show top views of engagement states between a link bar and a taper block of the second exemplary embodiment, in which FIG. 22A is a state where the mailslot function is not working and FIG. 22B is a state where the mailslot function is working;

DETAILED DESCRIPTION OF THE PREFERRED EMBODIMENTS

Hereinafter, a first exemplary embodiment of a magnetic tape library device (referred simply to as a device hereinafter) according to the present invention will be described in details by referring to the accompanying drawings (FIG. 1 to FIG. 15).

Figure 1:
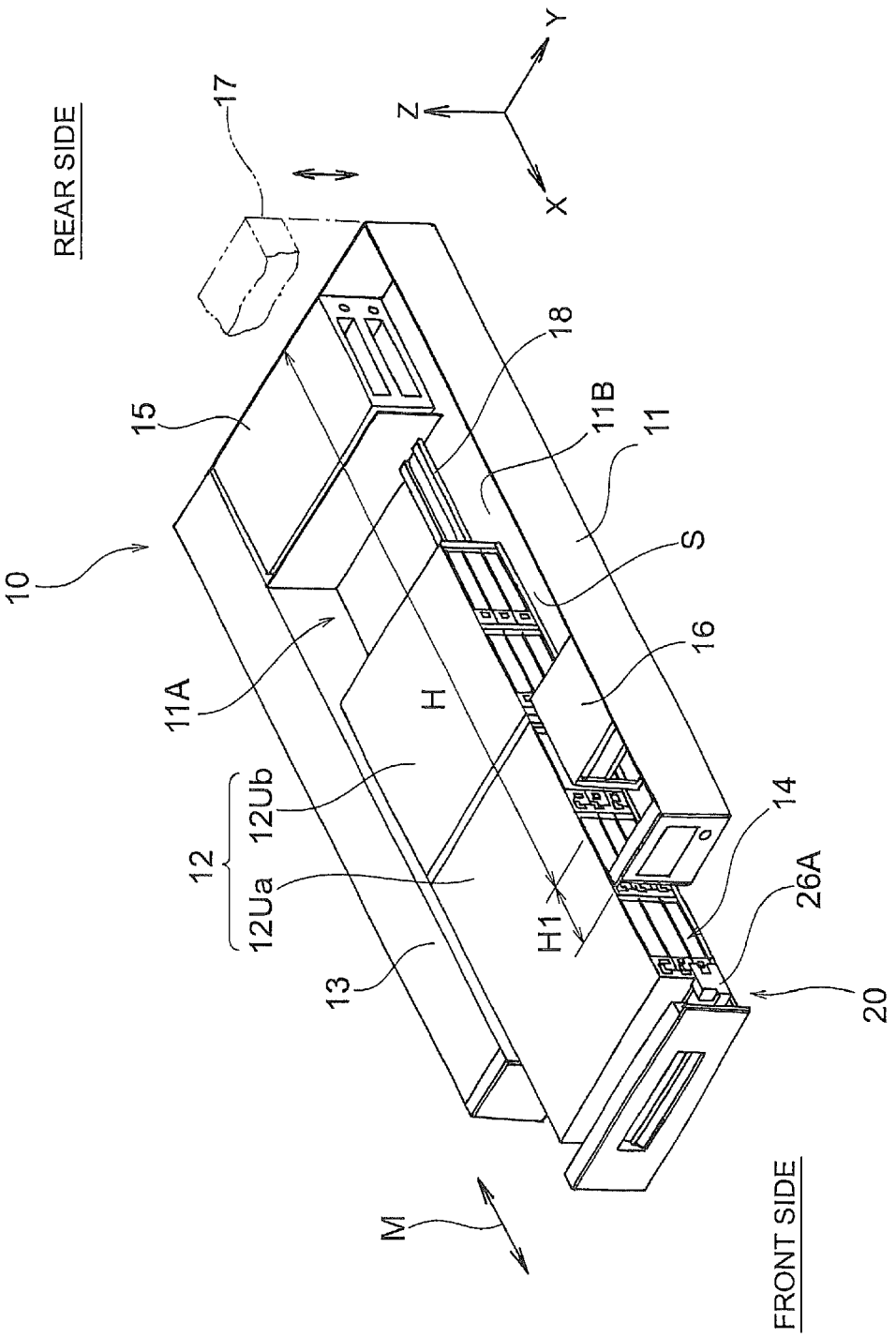
FIG. 1 is an overall perspective view showing a first exemplary embodiment of a library device according to the present invention.

FIG. 1 is an overall perspective view showing the structure of the device 10 of the first exemplary embodiment.

Note here that the longitudinal direction of the device 10 is defined as X-axis, the direction orthogonal to the X-axis within a horizontal plane, i.e., the width direction of the device 10, is defined as Y-axis, and the direction orthogonal to the X-axis and the Y-axis in the perpendicular direction is defined as Z-axis. It is to be noted that the X-axis, Y-axis, and Z-axis are written only in FIG. 1, and omitted in other drawings.

As shown in FIG. 1, the device 10 is structured by including: a magazine 12 which houses inside thereof cartridges 14 (see FIG. 3 for details) via multiple numbers of cells; a device main body 11 which houses the magazine 12 to be freely movable along inserting, drawing-out directions (inserting/extracting direction) M within a same horizontal plane; an accessor 16 provided on one side along the inserting/extracting direction M of the device main body 11 to be reciprocally movable along the inserting/extracting direction M, which exchanges the cartridges 14 between the magazine 12 and a magnetic tape drive (simply referred to as a drive hereinafter) 15 provided to the device main body 11; and a controller 13 which is provided in the device main body 11 on the opposite side of the accessor 16 and performs controls of the accessor 16.

Note that the inserting/extracting direction M is the same direction as the X-axis.

Further, in FIG. 1, the front side of the extracting direction of the magazine 12 (oblique left direction of FIG. 1) is defined as the front side of the device 10, and the deeper side of the inserting direction of the magazine 12 (oblique right direction of FIG. 1) is defined as the rear side of the device 10.

The magazine 12 of the first exemplary embodiment is a 2U magazine 12 in which a large number of cartridges are mounted such that two units 12Ua and 12Ub, for example, are connected along the inserting/extracting direction M and a plurality of stages (three stages in this exemplary embodiment) of cartridges are loaded in the height direction of the respective units 12Ua and 12Ub, for example.

The magazine 12 is guided by a guide rail 18 provided along the X-axis on a prescribed position of a bottom face 11B of the device main body 11. Thus, it can be moved only in the X-axis direction, and the actions in the Y direction and the Z direction are restricted.

The accessor 16 is set to be able to move in a moving range H (between the top end of the magazine 12 and the end part of the drive 15) of a case of normal operations, i.e., extraction of the cartridge from the magazine 12, housing thereof, setting and extraction of the cartridge to the drive 15, and in a moving range H1 of a case of the magazine extraction restriction release operation provided on an extended line of the moving range H.

The magazine extraction restriction release operation will be described in details in a later part. The accessor 16 extracts, houses, and moves (transport the cartridge 14) the cartridge 14 between the magazine 12 and the drive 15 as described above according to the control signals inputted from the controller 13.

Figure 2:
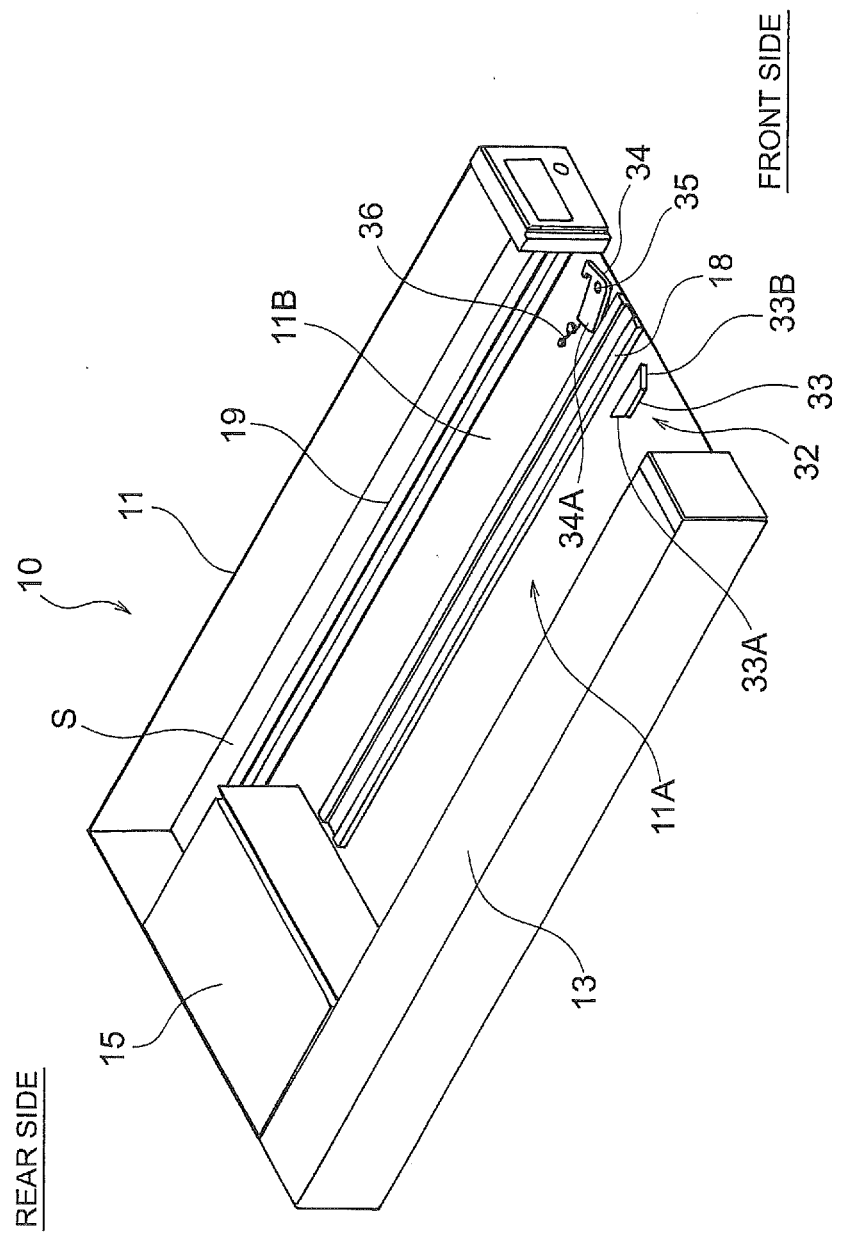
FIG. 2 is a perspective view showing a device main body of the library device according to the first exemplary embodiment.

The accessor 16 moves within a running path S by being guided by an accessor guide rail 19 as shown in FIG. 2.

The device 10 of the first exemplary embodiment includes a cartridge exchange number restricting mechanism (simply referred to as a restricting mechanism hereinafter) 20 which restricts the exchangeable number of the very front cells on the drawn side of the magazine 12 drawn out along the inserting/extracting direction M.

The main part of the restricting mechanism 20 is provided in the magazine 12, and it is constituted by including: a block section 26A which blocks ejection of the cartridge 14 from the cell 12A that does not require exchange of the cartridge 14; and a cell limiter 25 which holds the block section 26A at one end thereof and is an interlocker which operates in an interconnection manner when the magazine 12 is drawn out.

Further, the restricting mechanism 20 is constituted by providing an interlocker driving mechanism 32 for driving the cell limiter 25 to the device main body 11.

First, the structure of the magazine 12 will be described by referring to FIG. 3 to FIG. 5.

Figure 3:
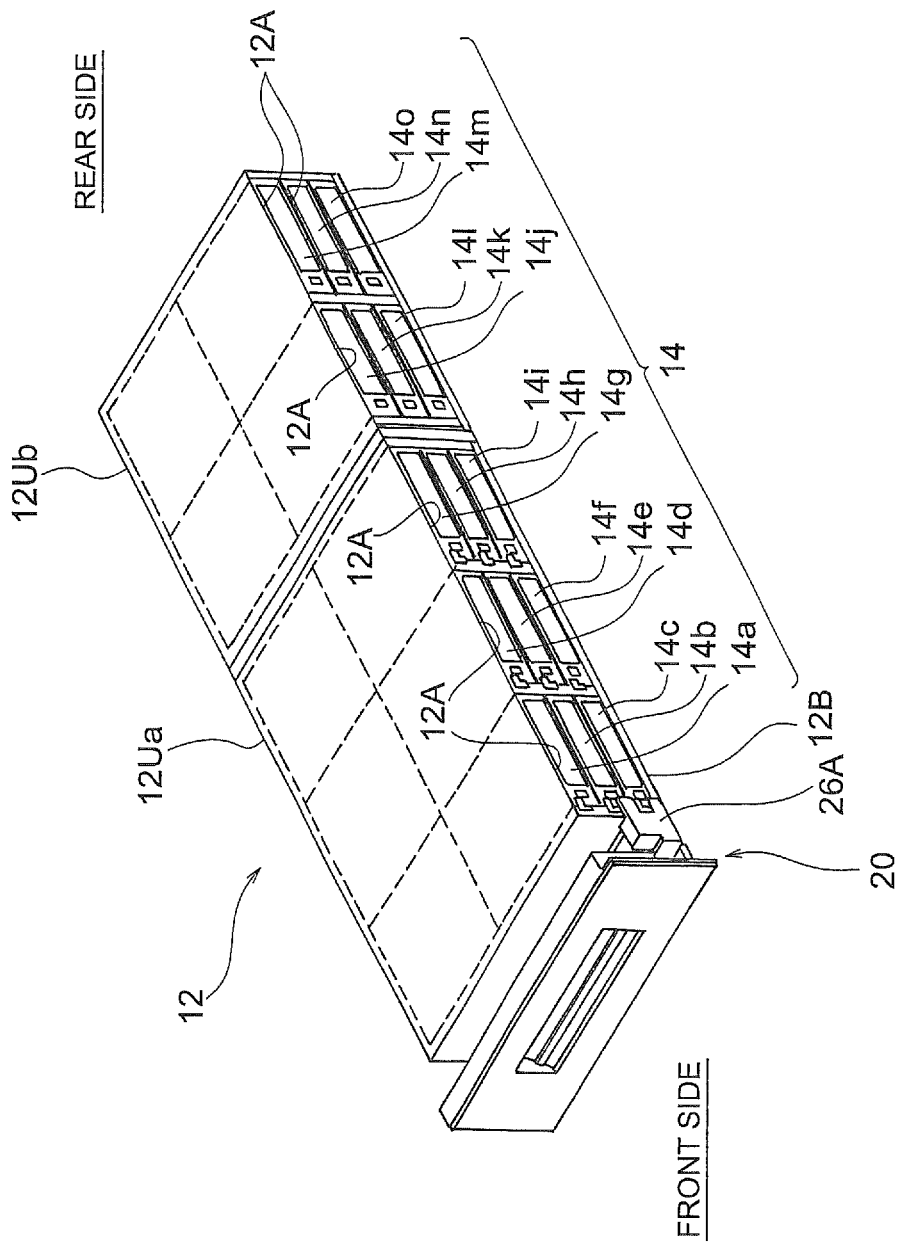
FIG. 3 is a top perspective view showing the magazine structure of the library device according to the first exemplary embodiment.
Figure 4:
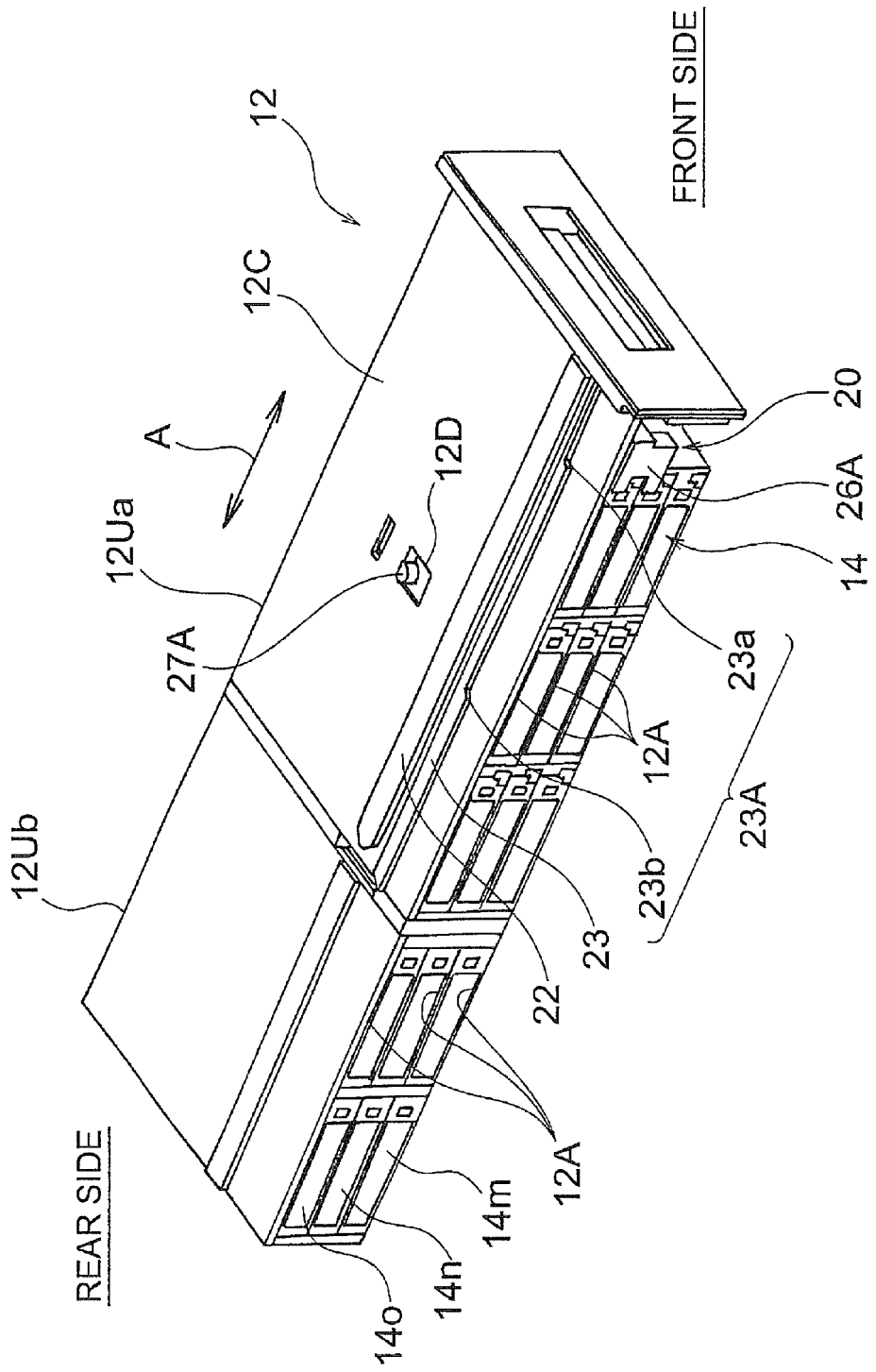
FIG. 4 is a bottom perspective view showing the magazine structure of the library device according to the first exemplary embodiment.
Figure 5:
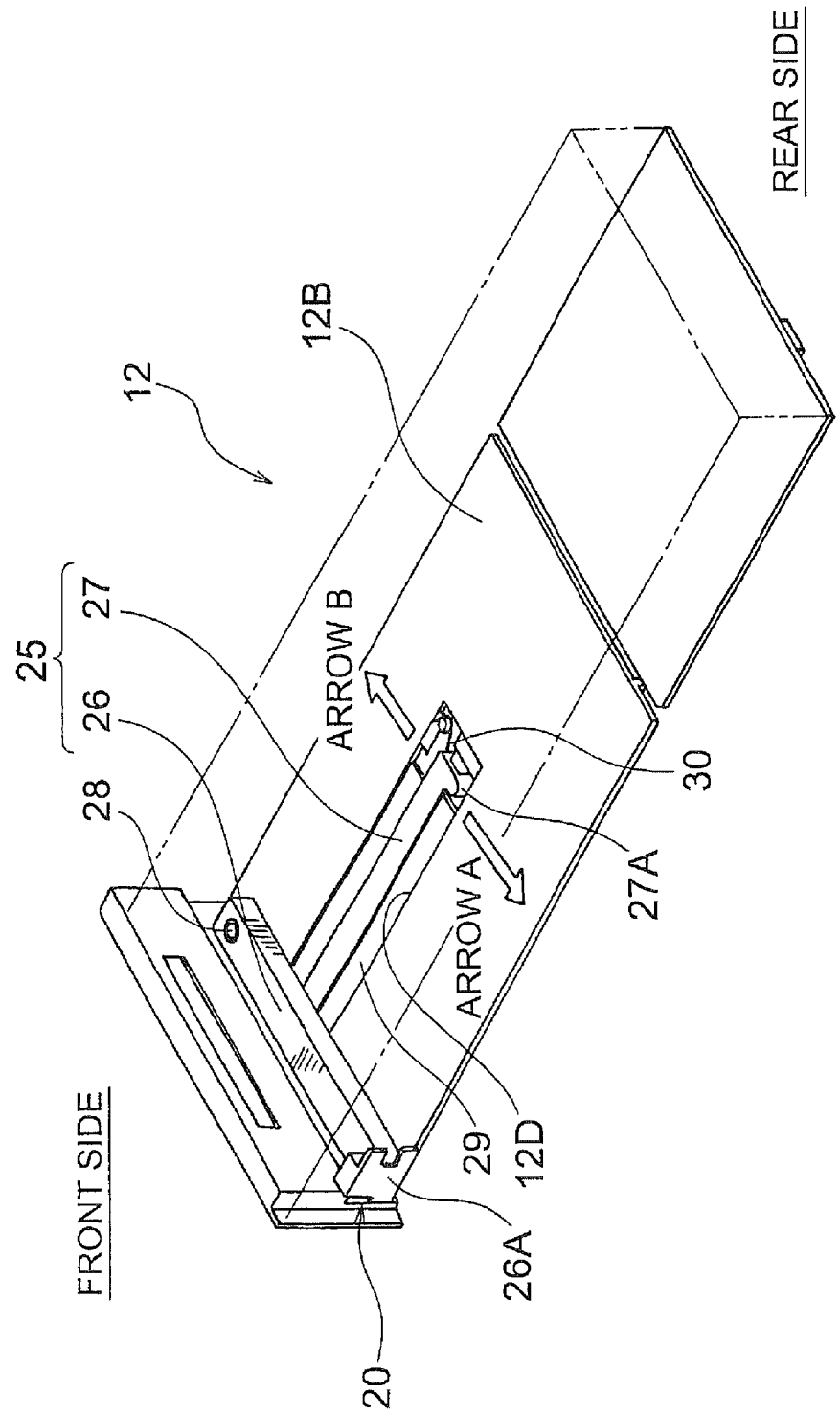
FIG. 5 is a magazine perspective view showing a state where a cell is transmitted through from the magazine of the library device according to the first exemplary embodiment.

FIG. 3 is a top perspective view showing the structure of the magazine 12, FIG. 4 is a bottom perspective view of the magazine 12 showing the structure of the magazine 12, and FIG. 5 is a magazine perspective view showing a state where the cell 12A is transmitted through from the magazine 12.

The magazine 12 in this exemplary embodiment is structured by including a plurality of cells, e.g., fifteen cells 12A, which are provided in three stages in the vertical direction and over five rows along the inserting/extracting direction M as shown in FIG. 3 in details. Each of the cells 12A is provided on the magazine base 12B as the base of the magazine 12, and it is a housing space formed to be able to house the cartridge 14.

In each cell 12A, two each of cartridges including the first cartridge 14a to fifteenth cartridge 14o disposed on the front side of the cartridge exchange direction and those housed on the far side of each of the cartridges 14a to 14o are to be housed.

Figure 7:
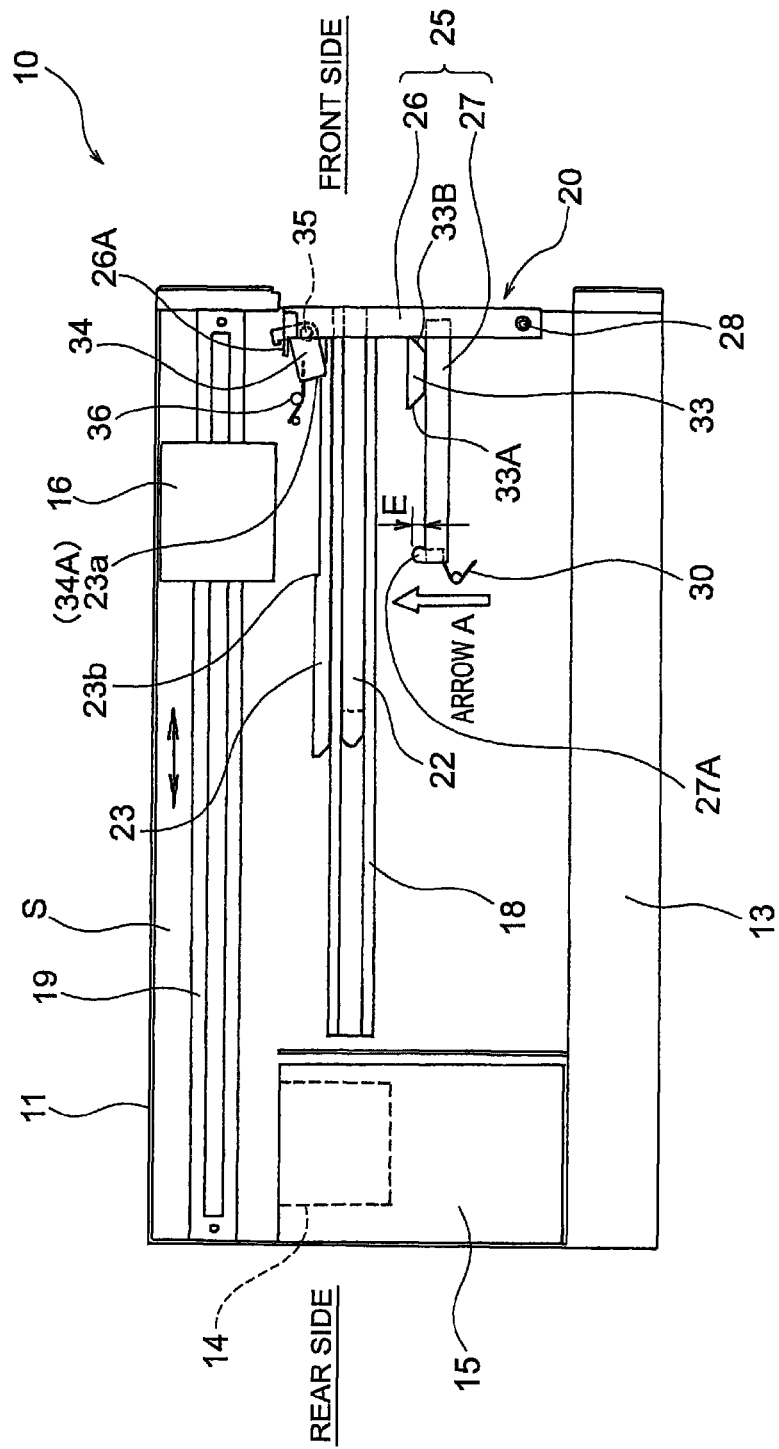
FIG. 7 is a top view showing a state where the cell and a magazine base are transmitted through from the magazine in the state of FIG. 6.
Figure 10:
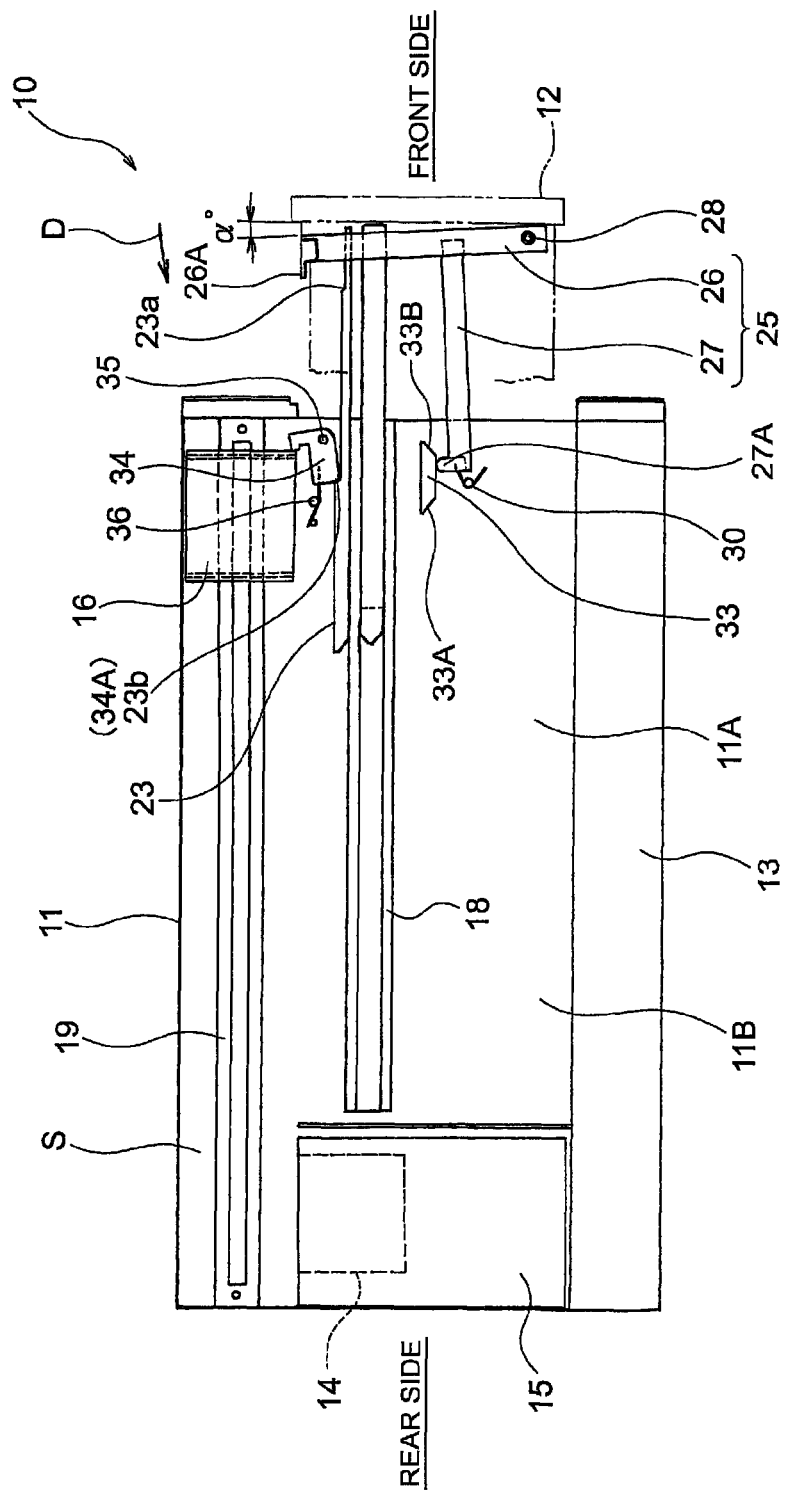
FIG. 10 is a top view showing a state where the cell and the magazine base are transmitted through from the magazine when the device of the first exemplary embodiment is in a mailslot function state.

As shown in FIG. 4, two guide rails 22 and 23 are provided substantially in parallel to the inserting/extracting direction M on a back face 12C of the magazine base 12B to be the bearing face of the cell 12A, and the guide rails 22 and 23 are provided to be substantially in parallel to each other. Out of those, the guide rail 22 is engaged with and guided by the guide rail 18 that is provided on the bottom face 11B of the device main body 11 as shown in FIG. 7 and FIG. 10.

Out of those guide rails 22 and 23, a step section 23A (see FIG. 4) constituted with two steps such as a first step 23a and a second step 23b is formed on the side face of the guide rail 23 on the side closer to the accessor 16.

The first step 23a is formed on the front side of the device 10, and the second step 23b is formed at a position distant from the first step 23a by a prescribed distance towards the rear side of the device 10.

Further, the width size of the guide rail 23 is formed in such a manner that the length between the first step 23a to the second step 23b and the length between the second step 23b to the last one become wider gradually with respect to the length between the front-side end of the device 10 to the first step 23a. Those steps 23a and 23b are provided to keep the magazine 12 in a state where the mail slot function is not working and a state where the mailslot function is working.

In the meantime, as shown in FIG. 5, the cell limiter 25 is placed on the magazine base 12B via a cell limiter attaching shaft 28, and the cell limiter 25 can be displaced within a substantially same parallel plane as the magazine base 12B.

A part of the cell limiter 25 is disposed in the gap between the magazine base 12B and the cells 12A, and the cell limiter 25 includes a top-end projection part 27A which is projected towards the back face 12C side of the magazine base 12B from a hole part 12D provided in the magazine base 12B.

As shown in FIGS. 5, 7, and 10, the cell limiter 25 is formed with: a sliding member 26; and a rocking member 27 fixed in an integrated manner with the sliding member 26 on the bottom face of the sliding member 26, which is displaced in the direction orthogonal to the inserting/extracting direction M when the magazine 12 is drawn out. As shown in FIG. 7, the both members 26 and 27 are formed substantially in T-shape on a plane.

The sliding member 26 is formed with a flat angular member. In the one end part (oblique left side in FIG. 5) on the accessor 16 side along the length direction of the sliding member 26, the block section 26A is provided for blocking the opening part of prescribed cells such as the cells 12A, 12A on the middle stage and the lower stage where the second cartridge 14b and the third cartridge 14c are housed, respectively, to inhibit extraction of the cartridges 14b, 14c housed in those cells 12A, 12A, respectively.

Figure 8:
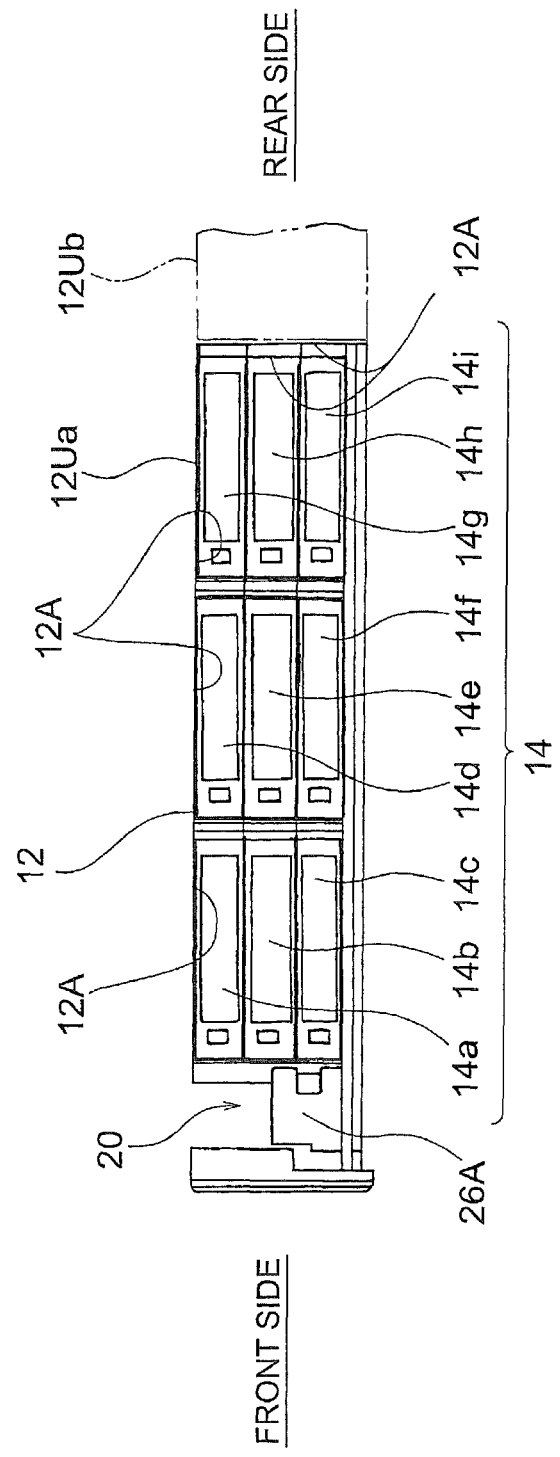
FIG. 8 is a side view of the magazine that is completely housed in the device main body of the first exemplary embodiment when viewed from the accessor side.
Figure 11:
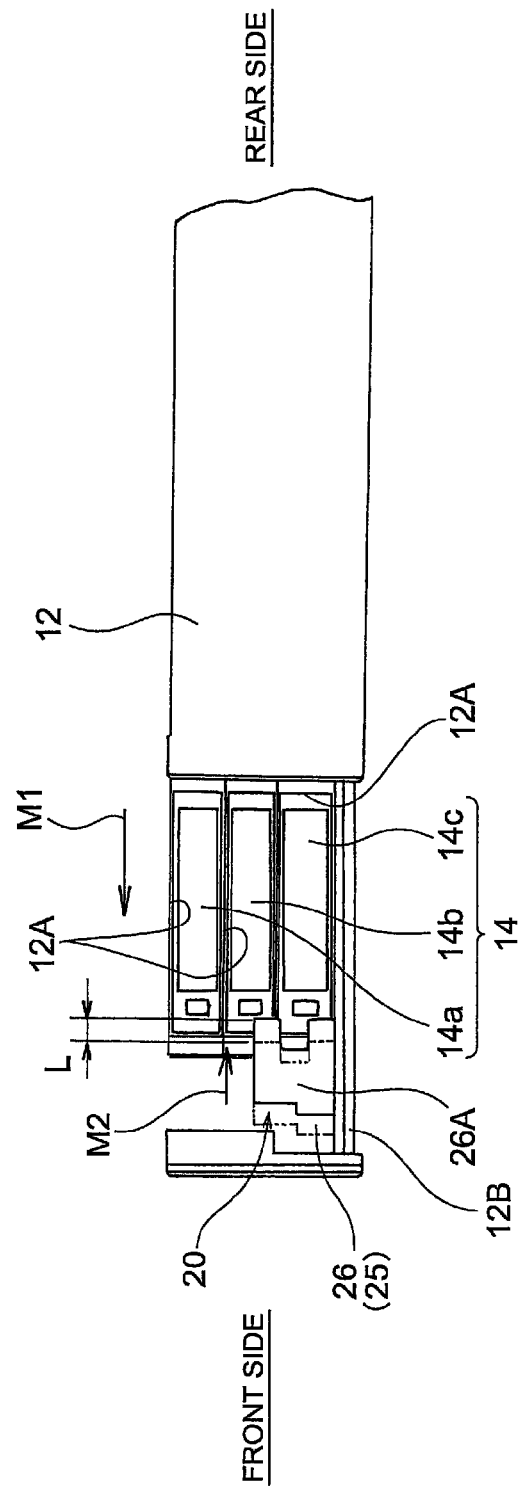
FIG. 11 is a side view showing a part of the magazine viewed from the accessor side when the device of the first exemplary embodiment is in a mailslot function state.

The block section 26A is formed with bifurcated projection parts extended along the inserting/extracting direction M from the side face of a rise part 26B (see FIG. 14) formed on one end part of the sliding member 26. As shown in FIGS. 8 and 11 in details, those bifurcated projection parts can block the opening parts of the cells 12A, 12A on the middle stage and the lower stage out of the cells 12A formed on the three stages to be the very front row in the drawing out direction of the magazine 12 to inhibit extraction of the cartridges 14 housed in those cells 12A, 12A, respectively. That is, it is possible to limit the number of exchangeable cartridges 14.

As shown in FIG. 5 in details, the other end of the sliding member 26 is provided in a freely rotatable manner on the magazine base 12B via the cell limiter attaching shaft 28 that is an attaching pin member.

The rocking member 27 is formed with a plate-type member by being extended along the longitudinal direction of the magazine base 12B from the bottom face of the sliding member 26 for a prescribed length, and the projection part 27A projected towards the accessor 16 side is formed on the top end thereof. Further, as shown in FIG. 7, the projection part 27A is set to have a projection length L.

The rocking member 27 is formed in an integrated manner with the sliding member 26 so that, as shown in FIG. 5, it can rock in the arrow A direction or the arrow B direction within the hole part 12D formed in the magazine base 12B along with the sliding action of the sliding member 26.

In the hole part 12D formed in the magazine base 12B, a supporting plate 29 for supporting the rocking member 27 is provided by covering the hole part 12D. Thereby, the rocking member 27 can rock on the top face of the supporting plate 29 by keeping a stable posture.

On the opposite side of the projection part 27A at the top end of the rocking member 27, a cell limiter spring 30 is attached as shown in FIG. 5. The cell limiter 25 is constantly energized towards the arrow A direction shown in FIG. 5 by the spring force of the cell limiter spring 30.

Thus, normally, the opening part of each cell 12A is not blocked by the block section 26A of the sliding member 26, and the cartridges 14 can be inserted and extracted to/from all the cells 12A within the magazine 12.

Further, torque is generated when the top-end projection part 27A of the rocking member 27 is moved to the arrow B direction shown in FIG. 5, and the cell limiter 25 rotates by having the limiter attaching shaft 28 as the axle. Therefore, as shown in FIG. 11, the block section 26A of the cell limiter 25 moves to the arrow M2 direction and block the opening parts of the cells 12A, 12A on the lower two stages.

As a result, it becomes impossible to insert/extract the second cartridge 14b and the third cartridge 14c to/from the blocked cells 12A, 12A.

Next, details of the device main body 11 will be described by returning to FIGS. 1 and 2.

FIG. 2 is an overall perspective view showing the device main body 11.

As shown in FIGS. 1 and 2, the entire part of the device main body 11 is formed in a rectangular box shape with a metal such as a thin steel plate. Further, a cover 17 (shown in FIG. 1 by an alternate long and short dash line) which covers the magazine 12, the drive 15, and the like is attached to the device main body 11 in a freely detachable manner.

The magazine 12 is to be housed in a magazine housing section 11A of the device main body 11.

A taper block 33, a lock lever 34, and the like constituting an interlocker driving mechanism 32 are provided on the bottom face 11B of the device main body 11, which constitutes the magazine housing section 11A. The cell limiter 25 is driven by each of those members 33, 34, and the like.

Further, the interlocker driving mechanism 32 is constituted with the taper block 33 and the top-end projection part 27A of the rocking member 27, and the restricting mechanism 20 is constituted with the interlocker driving mechanism 32 and the cell limiter 25.

The taper block 33 is a trapezoid-shaped block formed along the inserting/extracting direction M of the magazine 12. As shown in FIGS. 2 and 7, one sloping face 33A and the other sloping face 33B tilted in the opposite directions from each other are formed on both ends of the taper block 33 along the inserting/extracting direction M.

Regarding the taper block 33, the bottom side of the trapezoid is located on the accessor 16 side, and the sloping faces 33A and 33B are sloped by becoming narrower towards the top side of the trapezoid.

The taper block 33 is disposed in such a manner that it does not come in contact with the projection part 27A of the cell limiter 25 except for the case where the magazine 12 is in the vicinity of the mailslot function position (see FIG. 7, for example) and that, as shown in FIG. 10, the projection part 27A of the cell limiter 25 abuts against the top side of the trapezoid of the taper block 33 only when the magazine 12 is in the mailslot function.

Further, the lock lever 34 is placed on the bottom face 11B of the device main body 11 via a lock lever fixing shaft 35, and it is rotatable within a parallel plane that is substantially same as the bottom face 11B.

Further, the lock lever 34 is disposed in such a manner that a part thereof is located within the gap between the bottom face 11B of the device main body 11 and the bottom face of the magazine 12 when the magazine 12 is being housed.

Hereinafter, a part of the lock lever 34 located in the gap between the bottom face of the magazine base 12B and the bottom face 11B of the device main body 11 when the magazine 12 is being housed is referred to as an engaging part 34A.

Further, a part of the lock lever 34 is placed to be located on the running path S of the accessor 16, so that torque is generated when the accessor 16 abuts against that part. Thereby, the lock lever 34 rotates by having the lock lever fixing shaft 35 as the axle.

Furthermore, a lock lever spring 36 is attached to the lock lever 34. The engaging part 34A of the lock lever 34 is constantly energized to the guide rail 18 side by the lock lever spring 36.

When the magazine 12 is completely housed in the device main body 11 under such state, the magazine 12 cannot be drawn out from the device main body 11 unless the magazine extraction restriction release operation is executed since, as shown in FIG. 7, the first step 23a formed on the guide rail 23 of the magazine 12 and the engaging part 34A of the lock lever 34 are disposed to be engaged.

Further, by providing the second step 23b to be engaged with the engaging part 34A of the lock lever 34 as shown in FIG. 10 under the state where the cells 12A, 12A, and 12A of the one row in the very front row out of the multiple numbers of cells 12A of the magazine 12 from the device main body 11, it is possible to acquire the structure with which the magazine 12 can be drawn out to the position where only the front cells 12A, 12A, and 12A within the magazine 12 can be exposed to the outside of the device main body 11.

Next, actions for drawing out the magazine 12 from the device main body 11 in the device 10 of the exemplary embodiment will be described.

Figure 6:
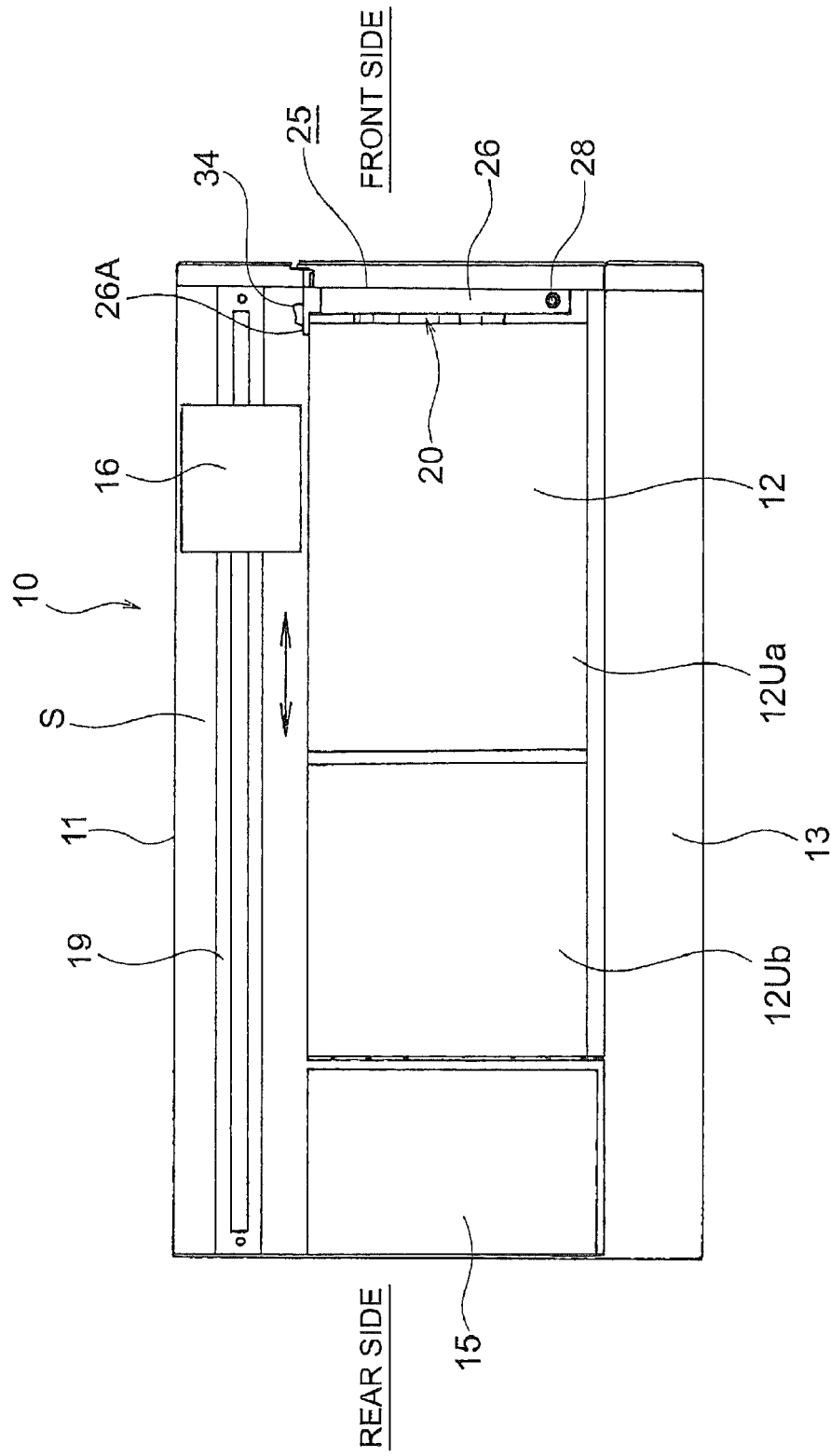
FIG. 6 is a top view showing a state where the magazine is housed in the device main body of the library device according to the first exemplary embodiment.

FIG. 6 shows a state where the magazine 12 is housed inside the device main body 11.

FIG. 7 shows the relation between the guide rails 22, 23 and the lock lever 34 as well as the relation between the cell limiter 25 and the taper block 33 under a state where the cells 12A and the magazine base 12B are transmitted through in the magazine 12.

FIG. 8 shows a side view of the magazine.

In a state where the magazine 12 is housed completely within the device main body 11, the engaging part 34A of the lock lever 34 is energized towards the guide rail 23 side by the elastic force of the lock lever spring 36 and engaged with the first step 23a of the guide rail 23 as shown in FIG. 7.

Further, a part of the lock lever 34 is projected towards the accessor 16 side.

In this state, the magazine 12 cannot be drawn out from the device main body 11 unless the accessor 16 moves and rotates the lock lever 34, i.e., unless the magazine extraction restriction release operation is executed.

Further, the rocking member 27 of the cell limiter 25 is energized towards the arrow A direction shown in FIG. 7 by the spring force of the cell limiter spring 30, so that the opening part of the cells 12A is not blocked by the block section 26A of the cell limiter 25.

Therefore, in the state where the magazine 12 is housed completely within the device main body 11, the cartridges 14 can be inserted/extracted to/from all the cells 12A of the magazine 12 as shown in FIG. 8.

Figure 9:
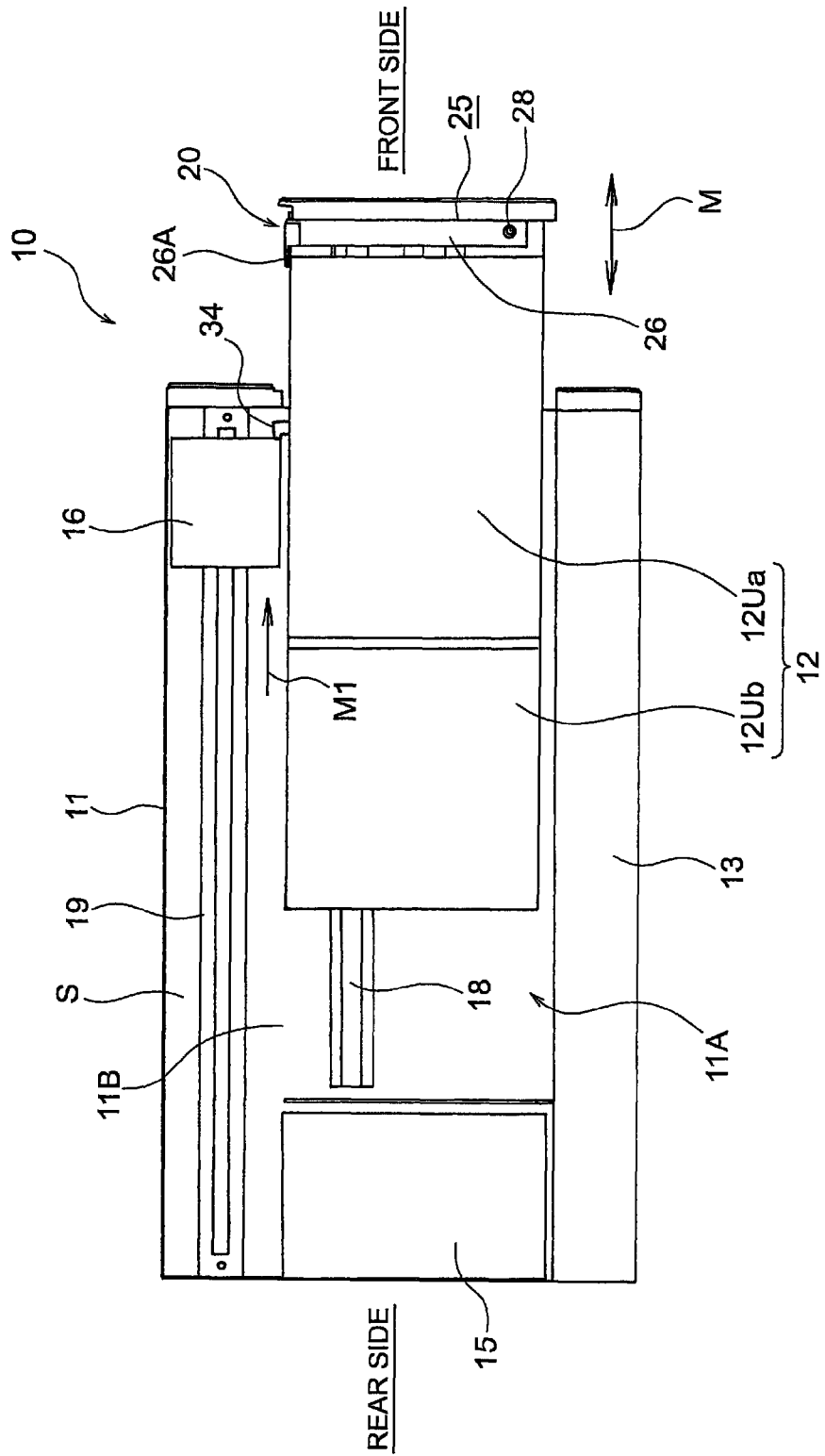
FIG. 9 is a top view showing the device main body and the magazine when the device of the first exemplary embodiment is in a mailslot function state.

Next, as shown in FIG. 9, when the accessor 16 is brought forward towards the front side of the device 10, the accessor 16 overpowers the elastic force of the lock lever spring 36 and rotates the lock lever 34. Thereby, as shown in FIG. 10, the engaging part 34A of the lock lever 34 is not engaged with the first step 23a of the guide rail 23 but engaged with the second step 23b of the guide rail 23.

When the magazine 12 is dawn out from the device main body 11 by hand under such state, the projection part 27A of the rocking member 27 comes in contact with the sloping face 33A of the taper block 33 within the device main body 11. Thus, the cell limiter 25 overpowers the elastic force of the cell limiter spring 30 and starts a sliding action by having the cell limiter attaching shaft 28 as the sliding center.

Further, as shown in FIG. 10, when the magazine 12 is drawn out by hand, the projection part 27A of the rocking member 27 reaches and abuts against the top side of the trapezoid from the sloping face 33A of the taper block 33 within the device main body 11 and the engaging part 34A of the lock lever 34 is engaged with the second step 23b of the guide rail 23.

Thus, the magazine 12 can be stopped in the state where the sells 12A, 12A, and 12A of one row in the very front row on the front side of the device 11 are being drawn out.

At this time, the sliding member 26 slides in the arrow D direction for the angle of α degree by having the cell limiter attaching shaft 28 as the sliding center. The angle of α degree is so set that the sliding action for the angle of α degree becomes substantially equivalent to the moving length L (see FIG. 11) of the block section 26A. Due to the sliding action for the angle of α degree, as shown in FIG. 11, the block section 26A moves to the rear side of the device 10 as shown by the arrow M2 to block the opening parts of the cells 12A, 12A on the middle and lower stages out of the cells 12A on the three stages on the front side of the drawing out direction of the magazine 12.

In this state, as described above, the block section 26A blocks the opening parts of the cells 12A, 12A on the middle and lower stages. Thus, the cells 12A, 12A blocked by the block section 26 cannot be inserted/extracted to/from the cartridges 14, so that the user can exchange the cartridge only in a single cell 12A on the higher-most stage. Therefore, it is possible to achieve the mailslot structure with which the minimum necessary number of cartridge can be exchanged.

Figure 12:
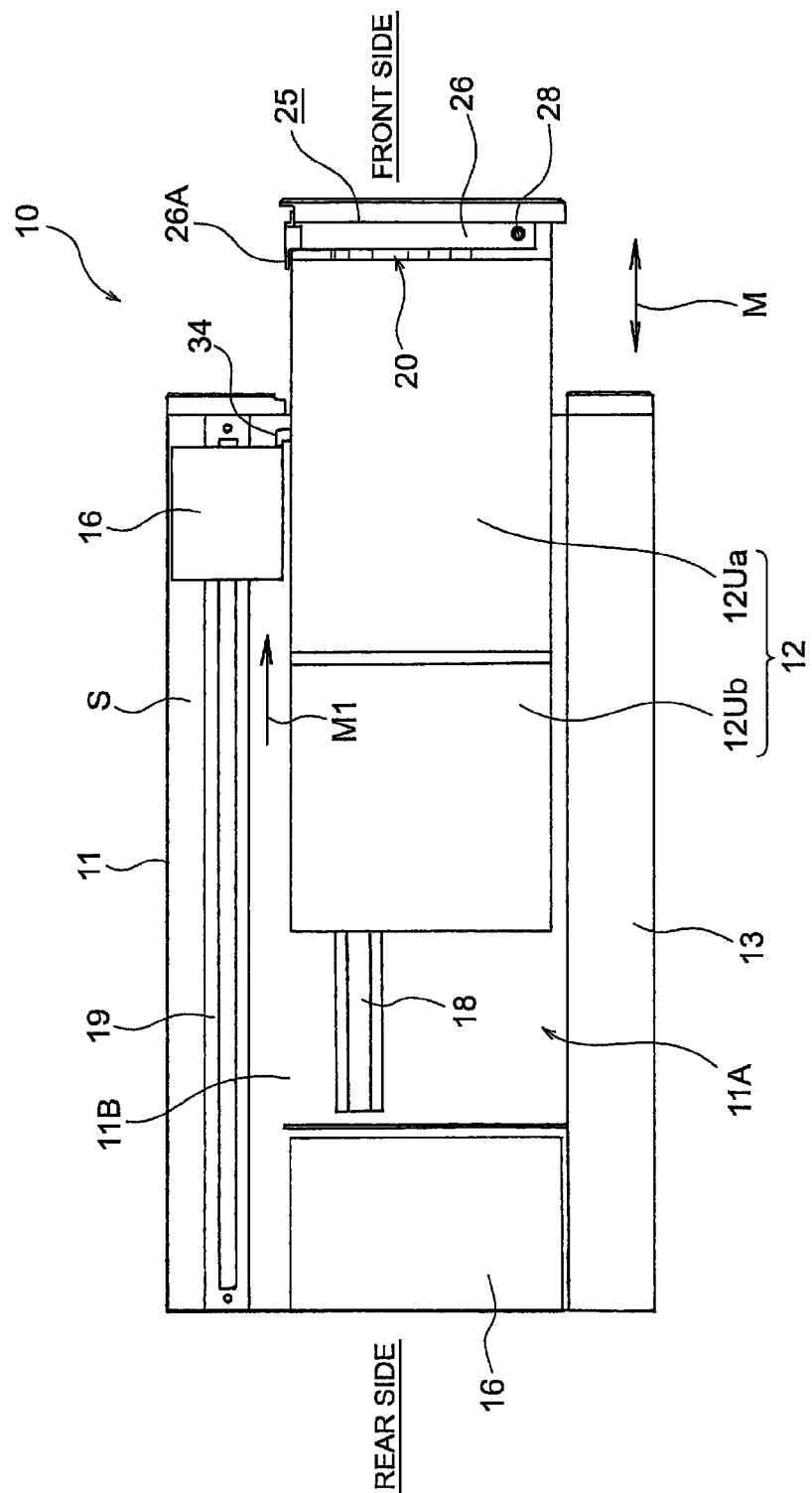
FIG. 12 is a top view showing the device main body and the magazine when the magazine is extracted from the device main body of the first exemplary embodiment.
Figure 13:
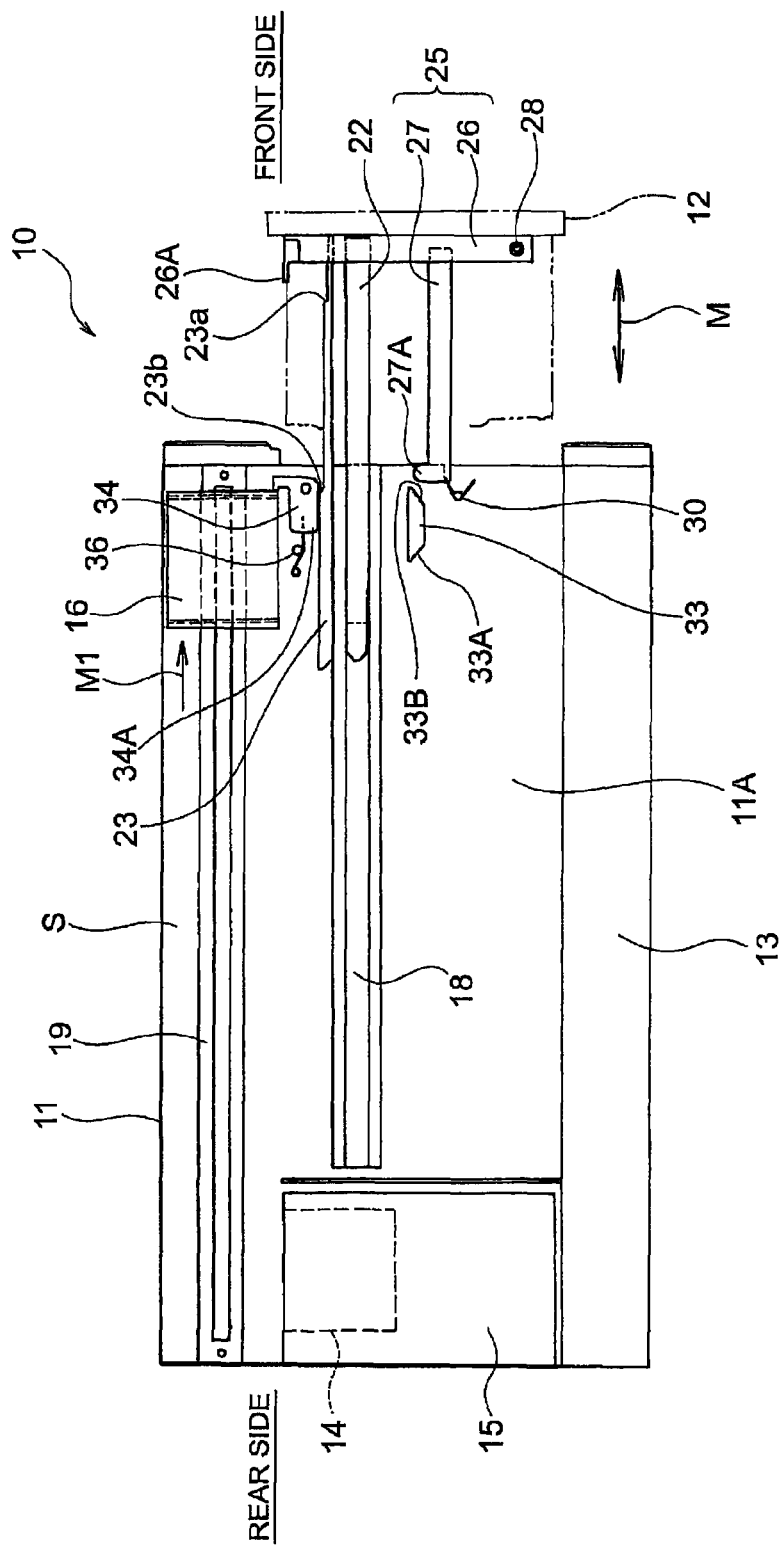
FIG. 13 is a top view showing a state where the cell and the magazine base are transmitted through from the magazine when the magazine is extracted from the device main body of the first exemplary embodiment.

Next, as shown in FIG. 12, when the accessor 16 is further brought forward and overpowers the elastic force of the lock lever spring 36 to rotate the lock lever 34 further, the engaging part 34A is not engaged with any of the steps, i.e., the first step 23a and the second step 23b, of the guide rail 23 as shown in FIG. 13.

When the magazine 12 is drawn out by hand under such state, the projection part 27A of the cell limiter 25 abuts against the other sloping face 33B successively from the top side of the trapezoid of the taper block 33 within the device main body 11. That is, the abutting part is shifted, so that the cell limiter 25 starts to rotate towards the initial state by the elastic force of the cell limiter spring 30.

Figure 14:
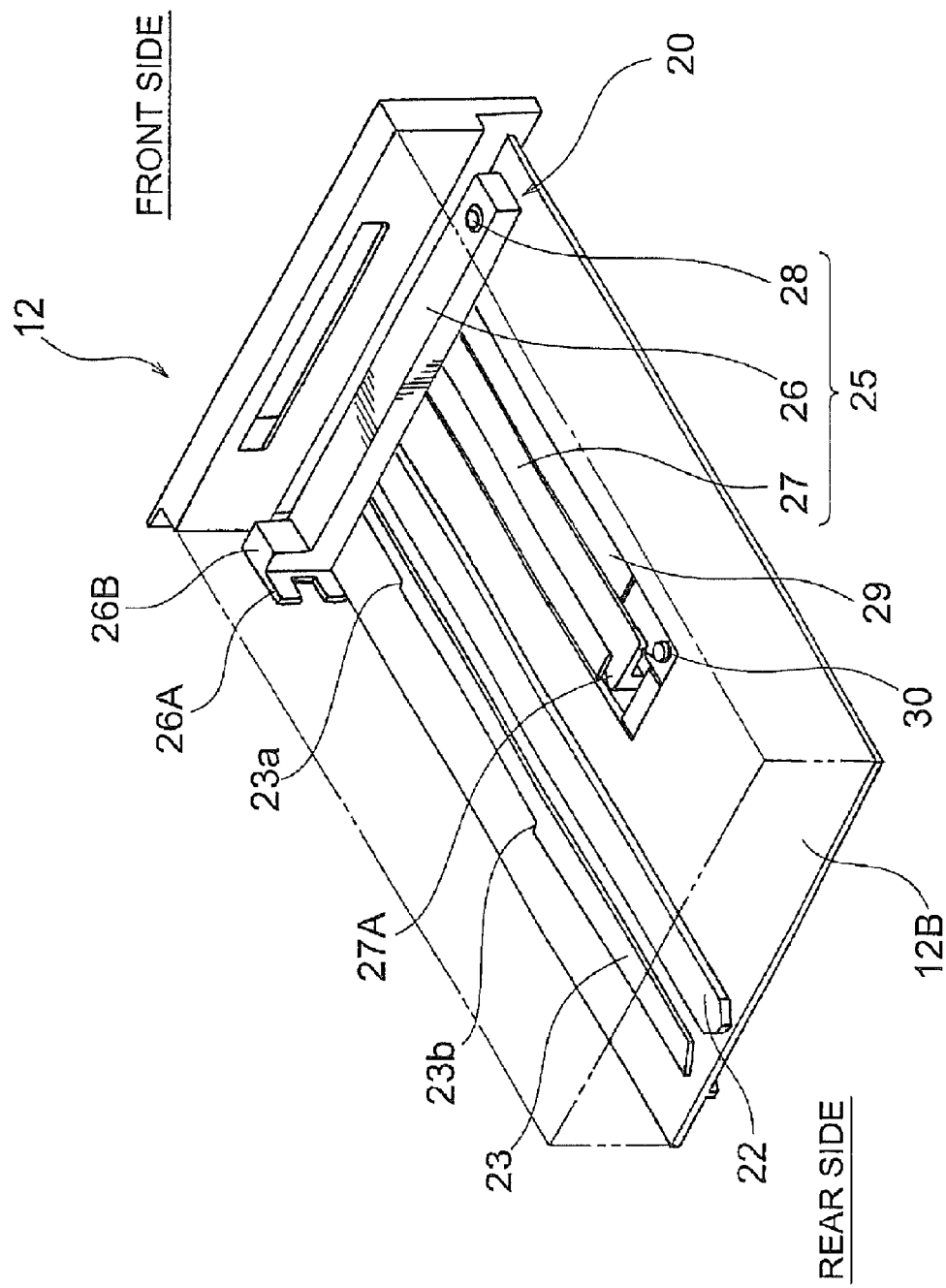
FIG. 14 is a perspective view showing a state where a cell is transmitted through from the magazine of the first exemplary embodiment.
Figure 15:
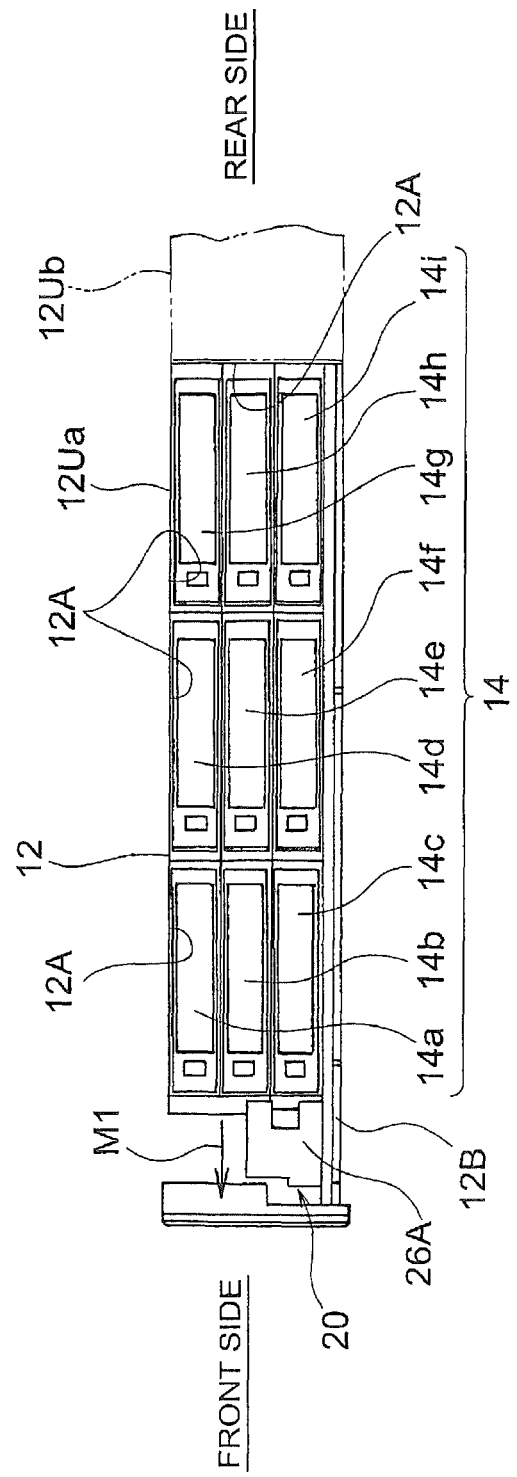
FIG. 15 is a side view showing only the magazine itself viewed from the cell opening part when the magazine is extracted from the device main body of the first exemplary embodiment.

When the magazine 12 is drawn out by hand further, as shown in FIG. 14 and FIG. 15, the cell limiter 25 is returned to the original position (initial position) completely by the elasticity of the cell limiter spring 30. In this state, the block section 26A of the rotated cell limiter 25 does not block the opening parts of all the multiple number of cells 12A.

Thus, in the state where the entire magazine 12 is ejected out from the device main body 11 completely, the cartridges 14a to 14o can be inserted/extracted to/from all the cells 12A of the magazine 12.

Therefore, when wishing to exchange the cartridges 14a to 14o of all the cells 12A within the magazine 12 or to exchange the cartridges on the deeper side of the inserting direction of the cartridges 14a to 14o, exchanges thereof may be done in the state shown in FIG. 15, i.e., in a state where the entire magazine 12 is drawn out from the device main body 11.

With the device 10 having such structure, the cartridges 14 can be exchanged in all the cells 1A within the magazine 12 when the magazine 12 s completely housed in the device main body 11 and when the magazine 12 is outside of the device main body 11. When the magazine 12 is in the mailslot position, it is possible to acquire the state where only the cartridge 14 in the single cell 12A on the very front side of the drawing side, for example, can be exchanged.

With the device 10 of the structure described above, following effects can be acquired.

(1) Since the cartridge exchangeable number restricting mechanism 20 is provided to the device 10, it is possible, even with the magazine 12 with the structure in which a plurality of stages of cells for housing the cartridges 14 inside thereof are loaded, to restrict the cartridges 14 from being ejected out from the remaining cells 12A except for at least a specific cell 12A out of a plurality of cells 12A in a state where the magazine 12 is drawn out and the plurality of cells 12A at the front-side drawer end part of the inserting/extracting direction M are out of the device main body 11. Thereby, it is possible with a simple structure to easily extract and exchange only the specific cartridge 14a or the like required to be exchanged at the time of the mailslot function. As a result, the trouble of finding the cartridge 14 to be exchanged becomes unnecessary, so that the operability can be improved.

(2) Since only the specific cartridge 14a is exchanged, the action for recognizing all the cartridges loaded on the magazine 12 can be saved. As a result, the inventory time can be shortened, so that the performance can be improved as well.

(3) The restricting mechanism 20 is constituted with the cell limiter 25 and the interlocker driving mechanism 32 constituting the interlocker, and the projection part 27A of the rocking member 27 constituting the cell limiter 25 is engaged with the taper block 33 within the device main body 11 constituting the interlocker driving mechanism 32 to affect the restricting mechanism 20 in accordance with the drawing out action of the magazine 12. Therefore, the structure of the restricting mechanism 20 can be simplified.

(4) The rocking member 27 constituting the cell limiter 25 and the cell limiter spring 30 are provided in the gap between the bottom face of the magazine base 12B and the bottom face 11B of the device main body 11. Further, the guide rails 22, 23 of the magazine 12 as well as the lock lever 34 and the lock lever spring 36 are also provided in the gap between the back face of the magazine base 12B and the bottom face 11B of the device main body 11. Therefore, the spaces for providing those can be saved. As a result, the size of the device 10 can be reduced.

(5) The rocking member 27 constituting the cell limiter 25 is provided to rotate the top face of the supporting plate 29 that is provided in a shape to block the hole part 12D of the magazine base 12, so that it is possible to perform the rocking movement in a stable posture.

(6) The first step 23a and the second step 23b are formed on the side face of the guide rail 23 provided on the bottom face of the magazine base 12B. When the lock lever 34 provided on the bottom face 11B of the device main body 11 is engaged with the first step 23a and the second step 23B, respectively, by the energizing force of the lock lever spring 36, the magazine 12 can be fixed at the position of the steps 23a and 23b. Further, when it is desired to draw out the magazine 12 to be in the mailslot state, the magazine 12 can be stopped at that position by engaging the lock lever 34 with the second step 23b. As a result, a specific cartridge 14 can be exchanged in a stable state.

As an exemplary advantage according to the invention, the magnetic tape library device according to the present invention of the current Specification is provided with the cartridge exchange number restricting mechanism, so that it is possible to restrict extraction of the magnetic tape cartridges from the cells except for the cell where at least one specific magnetic tape cartridge is housed out of a plurality of cells under a state where the magazine is drawn out and the plurality of cells are extracted to the outside of the device main body of the drawer end part on the front side of the inserting/extracting direction even with the magazine in the structure in which a plurality of stages of cells for housing the magnetic tape cartridges inside thereof are loaded. As a result, it becomes possible with a simple structure to easily extract and exchange only the specific cartridge that requires exchange at the time of the mailslot function.

Further, since only the specific cartridge is exchanged, required is only a small amount of action while saving the actions for recognizing all the cartridges loaded on the device side. This results in shortening the time for the inventory.

Next, a second exemplary embodiment of the present invention will be described by referring to FIG. 16 to FIG. 23.

In the second exemplary embodiment, same reference numerals are applied to the structures and used members same as those of the first exemplary embodiment, and only different points will be described by applying different reference numerals.

Figure 16:
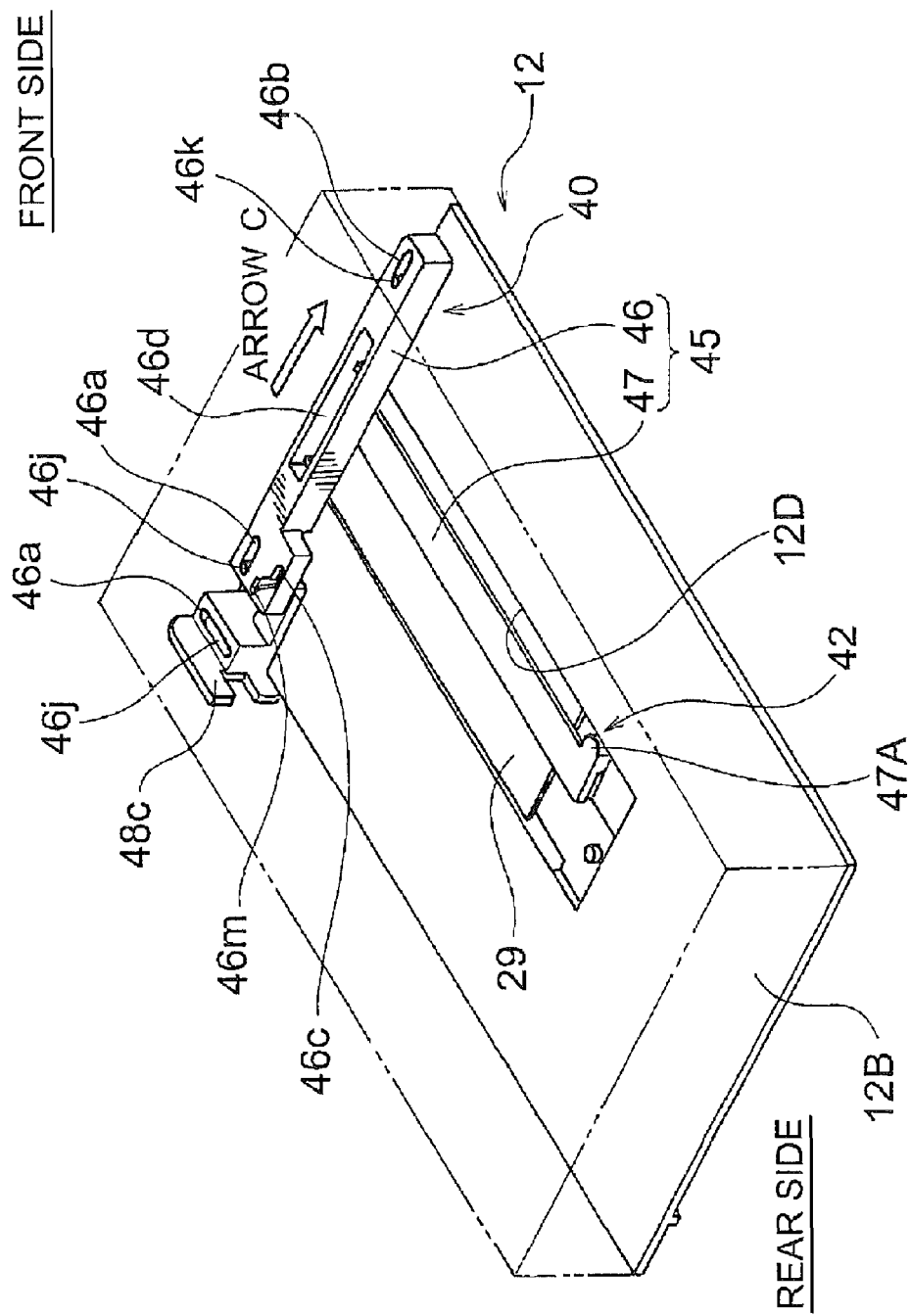
FIG. 16 is a perspective view of a second exemplary embodiment of the library device according to the present invention, which shows a state where a cell is transmitted through form a magazine.
Figure 17:
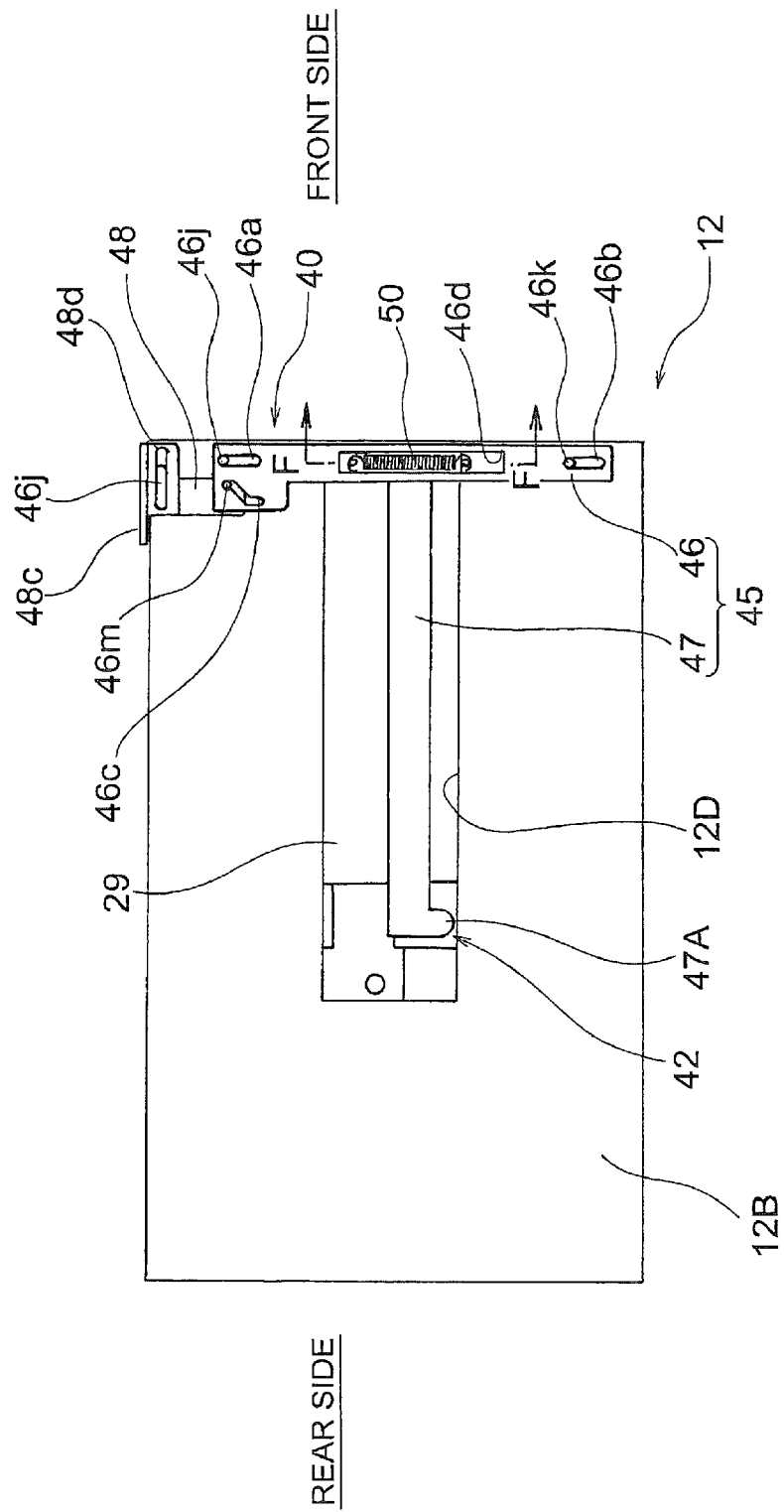
FIG. 17 is a top view of a state where the cell is transmitted through from the magazine of the library device according to the second exemplary embodiment.
Figure 18:
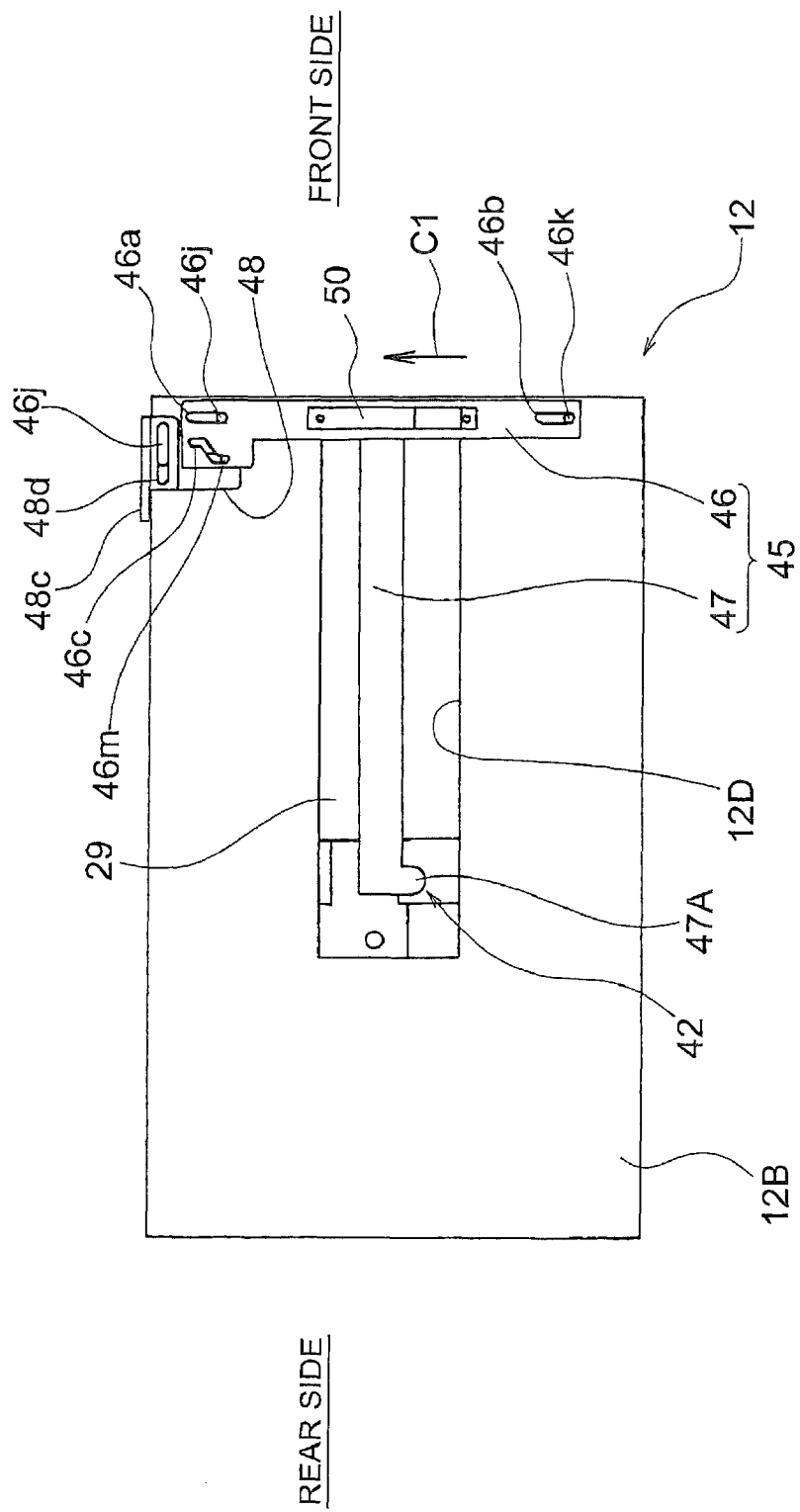
FIG. 18 is a top view showing a state where a slide member of a cell limiter is moved from the state of FIG. 17 to bring a block section forward.

FIG. 16 is a perspective view of a state where the multiple numbers of cells 12A are transmitted through from the magazine 12. FIG. 17 is a top view of a state where the mailslot function is not working, which shows a state where the multiple numbers of cells 12A are transmitted through from the magazine 12. FIG. 18 is a top view of a state where the mailslot function is working, which shows a state where the multiple numbers of cells 12A are transmitted through from the magazine 12.

A restricting mechanism 40 of the device 10 according to the second exemplary embodiment is constituted by including: a block section 48c which blocks ejection of a specific cartridge 14a and the like from a plurality of cells 12A; an interlocker 45 which holds the block section 48c at one end thereof, and operates in an interconnection manner when drawing out the magazine 12; and the interlocker driving mechanism 42.

As shown in FIG. 16 to FIG. 18, the interlocker 45 is constituted by including: a slide member 46 placed on the front-side end of the device 10 on the magazine base 12B; a link bar 47 provided integrally with the slide member 46 on the bottom face of the slide member 46; and a cell limiter main body 48 having the block section 48*c*, which is provided on one end of the slide member 46.

Further, the slide member 46 and the link member 47 are formed substantially in T-shape on a plane. The link member 47 corresponds to the rocking member 27 of the first exemplary embodiment.

When the magazine 12 is drawn out along the inserting/extracting direction M, the interlocker 45 is shifted to the direction (Y-axis direction; the width direction of the magazine 12) which is orthogonal to the inserting/extracting direction M in association with that action to slide the block section 48*c* formed in the cell limiter main body 48 that is provided on one end of the slide member 46 along the inserting/extracting direction M. Thereby, it is possible to block or release the opening part of the desired cells 12A, 12A and the like with the block section 48*c*. The slide member 46 is formed with a flat angular member, and straight-line slits 46*a*, 46*b* in a prescribed length are formed, respectively, along the Y-axis direction in both ends of the length direction.

Within each of the straight-line slits 46*a*, 46*b*, magazine base pins 46*j*, 46*k* are provided, respectively. The slide member 46 is provided to the magazine base 12B by each of the magazine base pins 46*j*, 46*k*.

Further, as shown in FIG. 17, in the substantially center part of the slide member 46 in the length direction, a center straight-line slit 46*d* in a prescribed length is formed along the length direction.

A cell limiter spring 50 is provided within the center straight-line slit 46*d*.

The cell limiter spring 50 is attached so as to constantly energize the slide member 46 and the link member 47 to the direction shown with an arrow C in FIG. 16, i.e., one side of the width direction (Y-axis direction) of the magazine base 12B.

Figure 19:
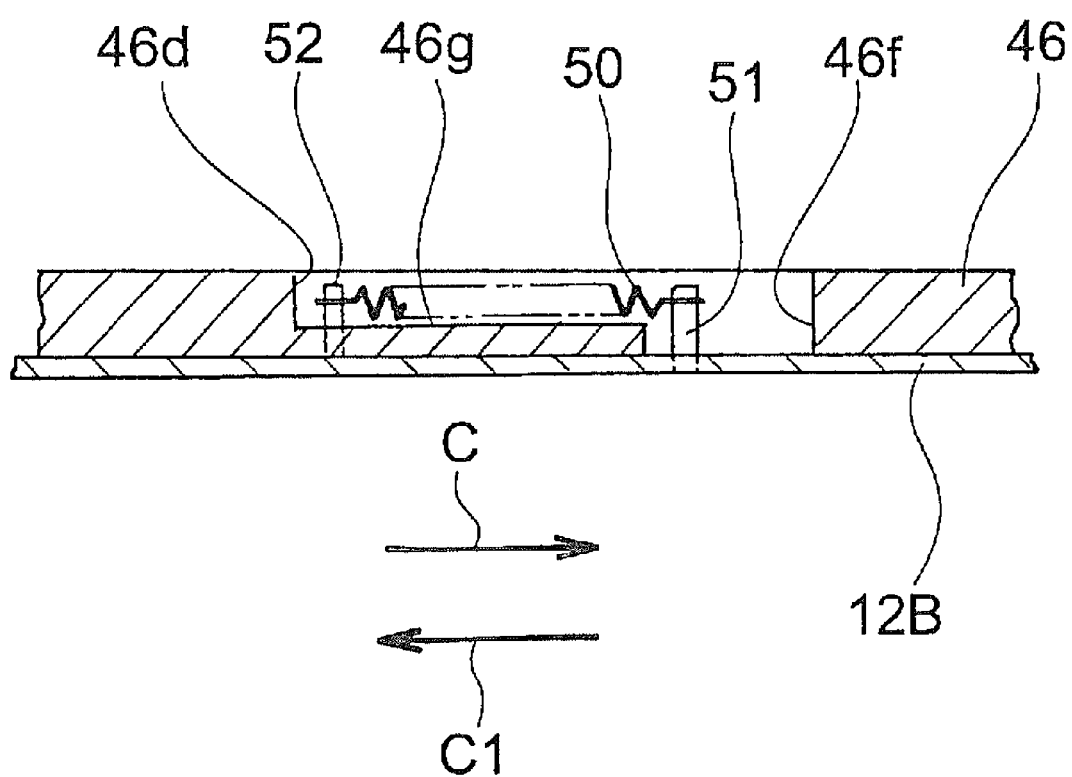
FIG. 19 is a longitudinal section taken along line F-F of FIG. 17.

Note here that, as shown in FIG. 19, the center straight-line slit 46*d* is formed with a through-hole part 46*f* formed in the end part of the direction shown with the arrow C and a U-shaped groove 46*g* which is continued from the through-hole part 46*f* and formed on the cell limiter main body 48 side.

One end of the cell limiter spring 50 is fixed to one attaching pin 51 provided to the magazine base 12B located within the through-hole part 46*f*, and the other end is fixed to the other attaching pin 52 provided within the U-shaped groove 46*g*.

Thus, normally, the slide member 46 is energized to the magazine base 12B to the direction shown with the arrow C. However, when the slide member 46 is shifted to the direction C1 opposite from the direction shown with the arrow C by an external force, the cell limiter spring 50 is extended by resisting the energizing force of the cell limiter spring 50.

In the vicinity of the straight-line slit 46*a* on the accessor 16 side (upper side of FIG. 17) out of the straight-line slits 46*a* and 46*b* of the slide member 46, a crank-type slit 46*c* is formed on the rear side of the device 10 with a prescribed space provided therebetween.

Figure 20:
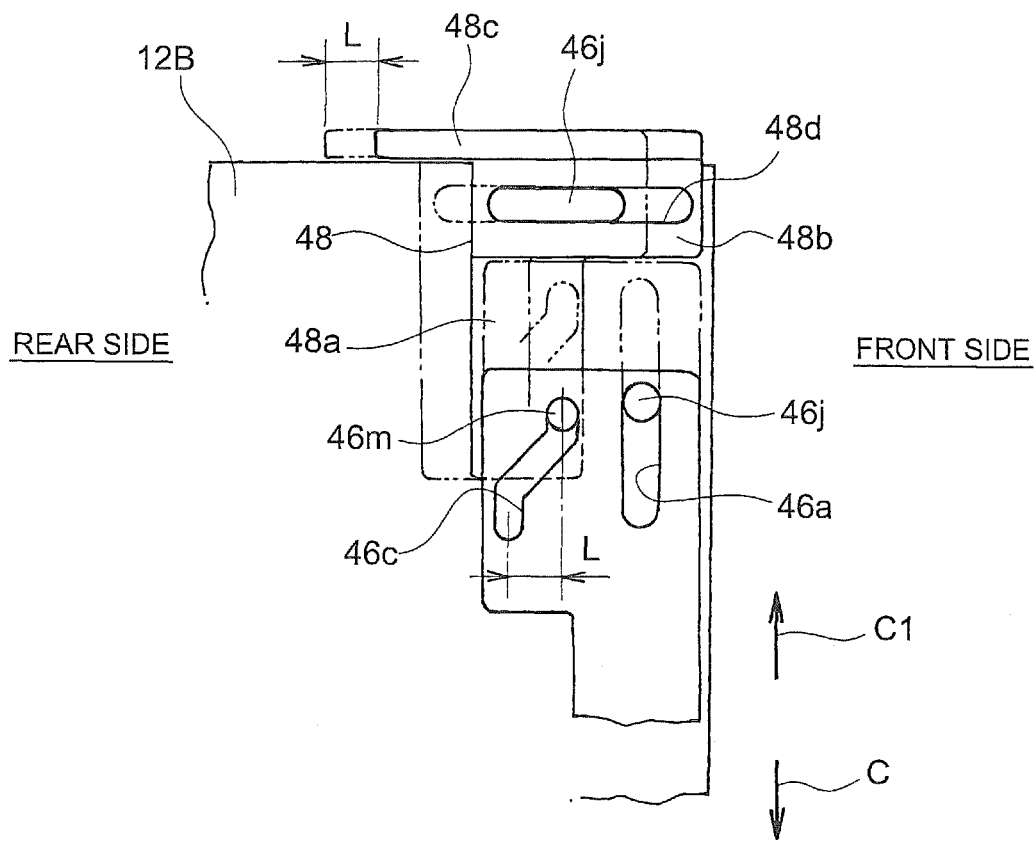
FIG. 20 is a top-part detailed view showing the structure of the cell limiter main body of the second exemplary embodiment.

That is, as shown in details in FIG. 20, the crank-type slit 46*c* is formed in a crank form along the width direction (Y-axis direction) of the magazine base 12B. The crank-type slit 46*c* is formed with two lines of straight-line slit sections formed in the inserting/extracting direction M with a prescribed length provided therebetween and sloping slit sections connecting those end parts of the straight-line slit sections.

For the space of the length L, the straight-line slit 48*d* formed in the rise part 48*b* engaged with the magazine base pin 46*j* slides, i.e., the cell limiter main body 48 slides, along the inserting/extracting direction M for the length L. Thereby, the block section 48*c* of the cell limiter main body 48 formed in a bifurcated manner moves along the inserting/extracting direction M to the rear side of the device 10, and the block section 48*c* can block the opening parts of the cells 12A, 12A on the middle and lower stages on the very front row stacked in three stages out of the cells 12A as in the case of FIG. 11 of the first exemplary embodiment, for example.

As described above, the block section 48*c* is formed in a part of the cell limiter main body 48. That is, as shown in FIG. 20 and the like, the cell limiter main body 48 is constituted by including: a plan part 48*a* connected to one end of the slide member 46; the rise part 48*b* formed on one end of the plan part 48*a* in a connected manner; and the block section 48*c* formed on the side face of the rise part 48*b*.

Further, the cell limiter main body 48*b* and the slide member 46 are connected by a cell limiter pin 46*m* provided to the plan part 48*a* of the cell limiter main body 48.

That is, the cell limiter pin 46*m* is housed within the crank-type slit 46*c* and engaged with the crank-type slit 46*c*.

Therefore, when the slide member 46 slides to the arrow C1 direction in association with the drawing out action of the magazine 12 from the initial state shown with a solid line in FIG. 20, i.e., the state where the mailslot function is not working, the crank-type slit 46*c* is guided by the cell limiter pin 46*m*.

As described above, the slide member 46 and the cell limiter main body 48 are connected via the cell limiter pin 46*m*. Meanwhile, the cell limiter main body 48 is guided to the magazine base 12B via the magazine base pin 46*j* provided to the magazine base 12B, and the magazine base pin 46*j* is provided within the straight-line slit 48*d* formed in the rise part 48*b* of the cell limiter main body 48.

Therefore, as described above, when the slide member 46 slides towards the arrow C1 direction, the crank-type slit 46*c* is guided by the cell limiter pin 46*m*. Thereby, as shown with a virtual line in FIG. 20, the cell limiter main body 48 and the block section 48*c* thereof slide to the left direction (the rear side of the device 10) for the length of L.

As a result, as described above, the block section 48*c* can block the opening parts of the cells 12A, 12A on the middle and lower stages of the very front row stacked in three stages of the cells 12A, for example.

Figure 21:
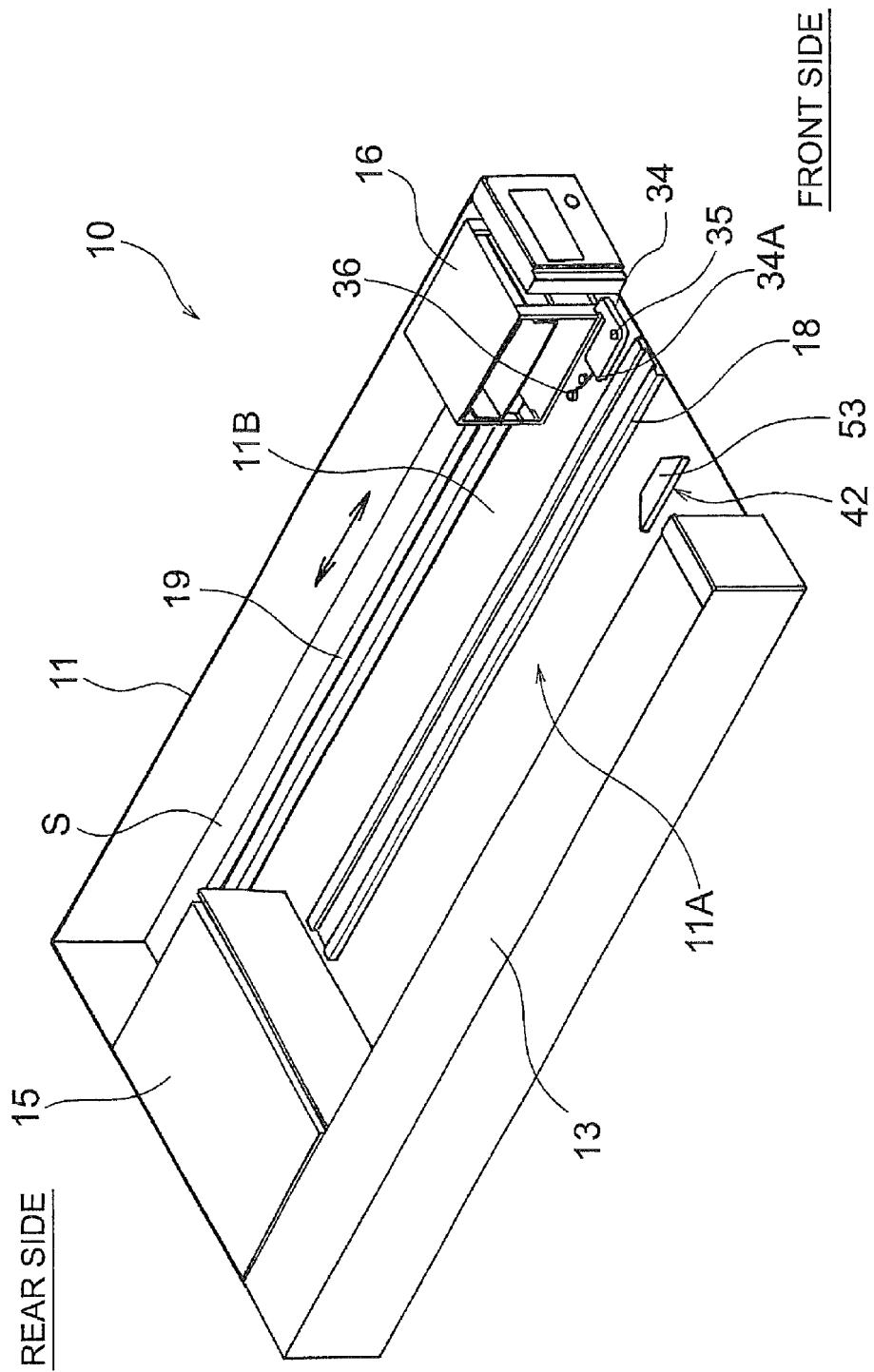
FIG. 21 is an overall perspective view showing the device main body of the second exemplary embodiment.

The structure of the device main body 11 of the second exemplary embodiment is shown in FIG. 21 for the structure of the magazine side described above. In the second exemplary embodiment, the direction of the projection part 47A of the link bar 47 and the direction of the taper block 53 provided to the device main body 11 are different from those of the first exemplary embodiment.

The projection part 47A of the link bar 47 according to the second exemplary embodiment is facing towards the controller side 13, and the slide member 46 integrated with the link bar 47 shifts to the Y-axis direction due to the shift of the projection part 47A in the Y-axis direction. Further, in order to slide the slide member 46 towards the Y-axis direction, the taper block 53 is fixed at the bottom face 11A of the device main body 11 in a state where one sloping face 53A and the other sloping face 53B of the taper block 53 abutting against the projection part 47A of the link bar 47 are facing towards the accessor 16 side.

As described above, the cell limiter main body 48 moves to the front and back in the inserting/extracting direction M (X-axis direction) by the reciprocal movement of the slide member 46 in the Y-axis direction. As shown in FIG. 22, the reciprocal movement of the slide member 46 in the Y-axis direction is done by the engagement between the projection part 47A of the link bar 47 and the taper block 53.

Note here that the interlocker driving mechanism 42 is constituted with the projection part 47A and the taper block 53.

Figure 22A:
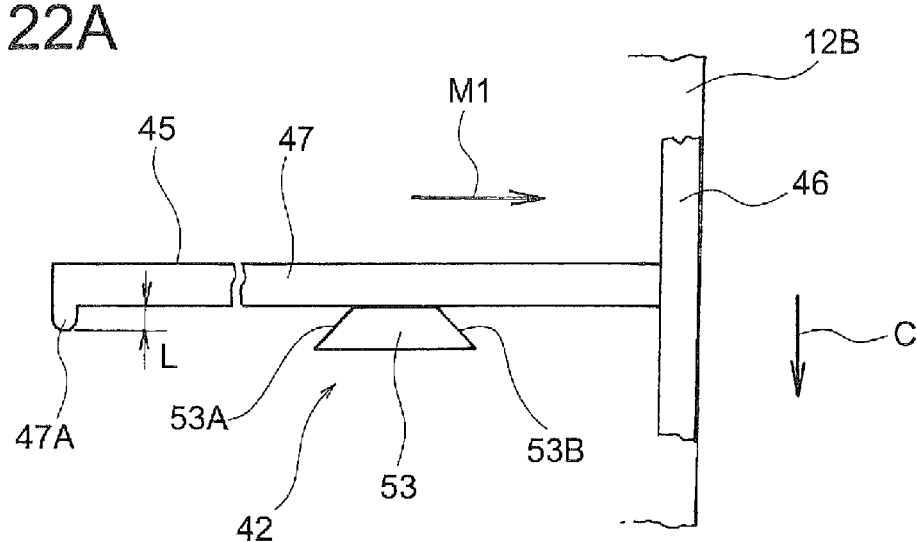
Figure 22B:
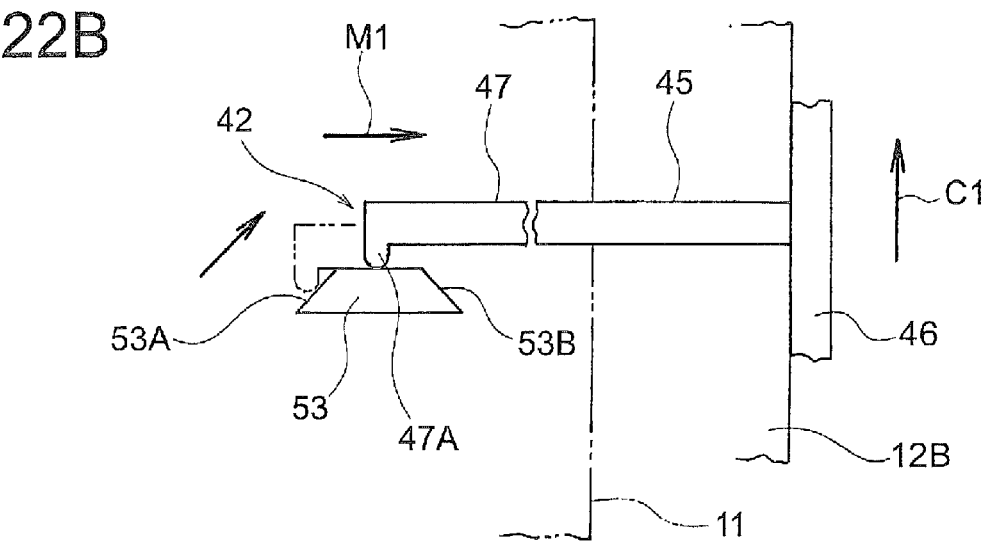

That is, as shown in FIG. 22A, when the slide member 46, i.e., the interlocker 45, is in the initial state, i.e., is in a state where the energizing force of the cell limiter spring 50 is working, the side-face part of the link member 47 abuts against the top side of the trapezoid of the taper block 53. However, as shown in FIG. 22B, when the magazine 12 is drawn out along the drawing out direction M1, the projection part 47A of the link bar 47 is brought closer to the taper block 53. When the magazine 12 is drawn out further, the projection part 47A comes to run on the sloping face 53A of the taper block 53 and then to run on the top face of the taper block 53 after going over the sloping face 53A.

At the point where the projection part 47A runs on the sloping face 53A of the taper block 53, the slide member 46 gradually starts to slide in the arrow C1 direction. When the projection part 47A reaches the top face of the trapezoid after going over the sloping face 53A, the slide member 46 is shifted to the arrow C1 direction for the amount of the projection length E of the projection part 47A.

Further, the block section 48c operates for the amount of the shift length L defined by the crank-type slit 46c according to the projected length E of the projection part 47A.

With the device 10 of the second exemplary embodiment in the structure described above, it is possible to acquire substantially same effects as those described in (1) to (6).

While the present invention has been described above by referring to the specific exemplary embodiments, the present invention is not limited only to each of the exemplary embodiments.

Any changes and modifications occurred to those skilled in the art can be applied to the structures and the details of the present invention. Further, it is to be noted that the present invention includes combinations of a part of or the entire part of the structures of each of the exemplary embodiments combined mutually in an appropriate manner.

For example, when the magazine 12 is at the mailslot position in each of the exemplary embodiments, the opening parts of the cells 12A, 12A on the lower two stages on the very front row of the drawing side out of the three cells 12A are blocked and only the single cell 12A on the higher most stage is in a state capable of exchanging the cartridge 14. However, the present invention is not limited only to such case.

Figure 23:
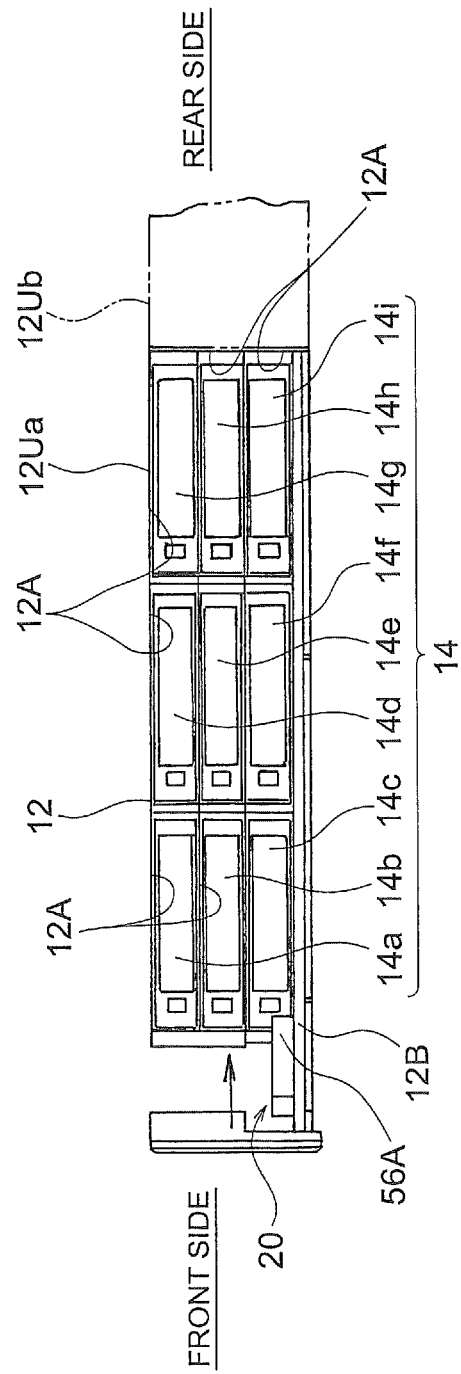
FIG. 23 is a side view showing a magazine of a modification mode of the present invention.
Figure 24:
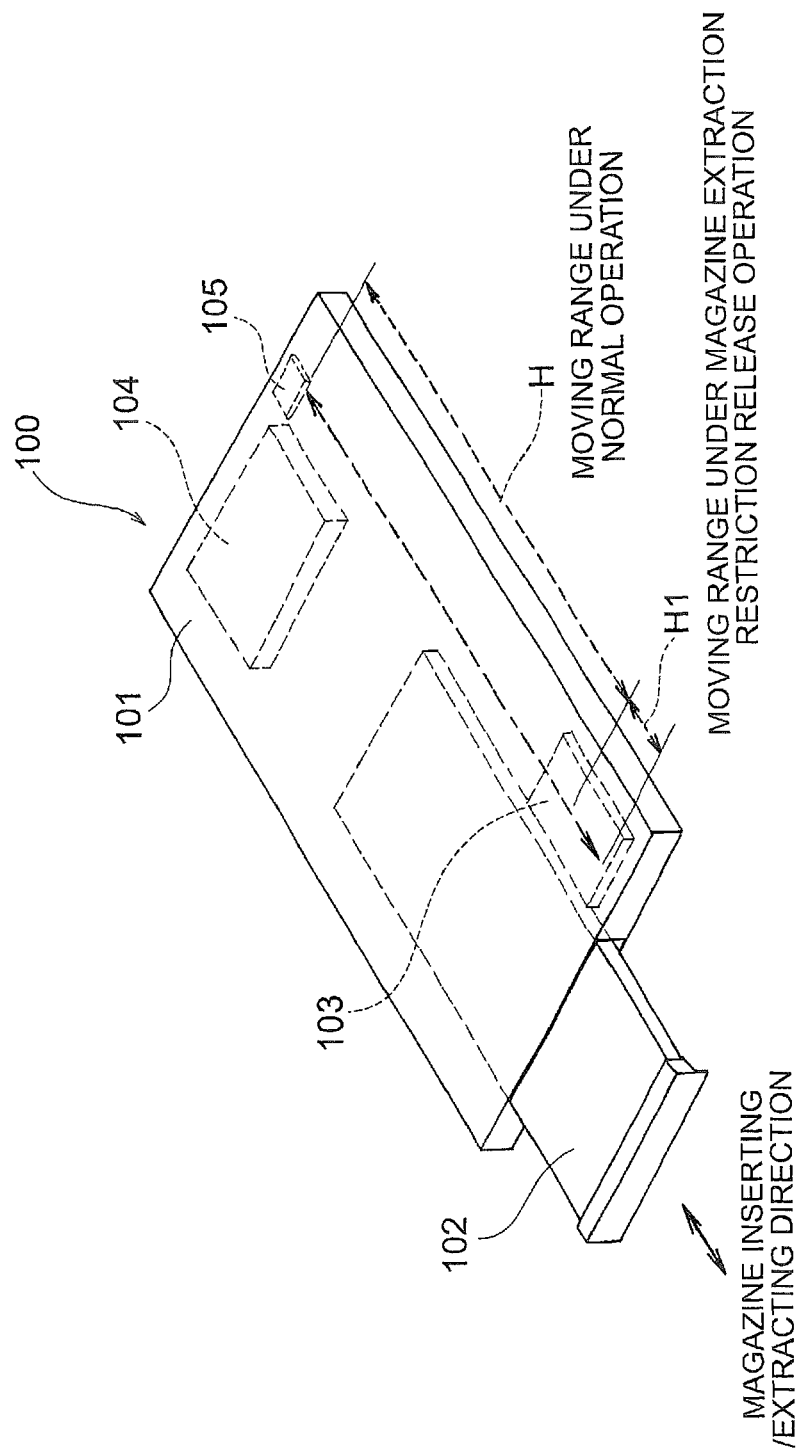
FIG. 24 is an overall perspective view showing a library device of a conventional case at the time of a mailslot function.
Figure 25:
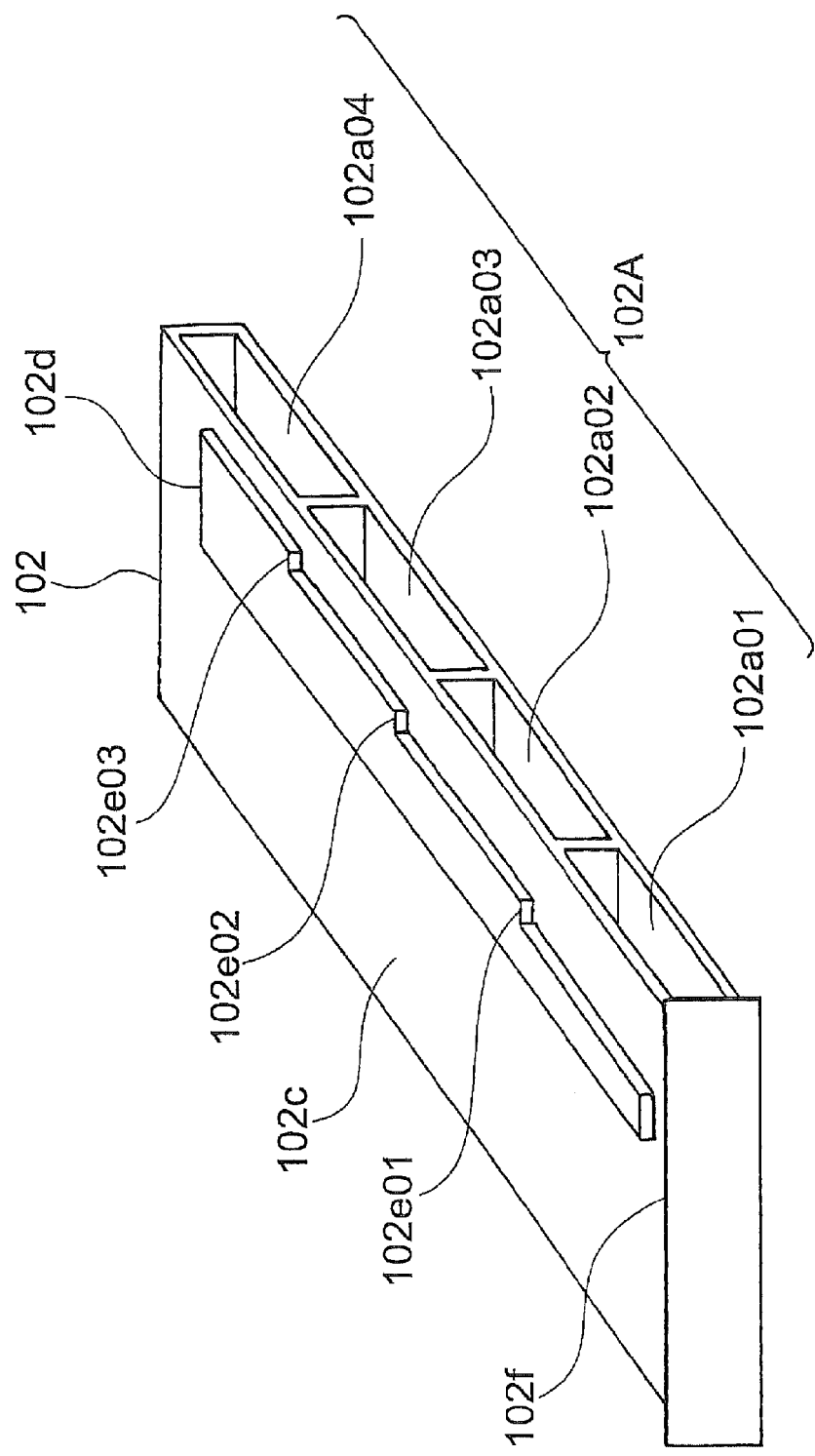
FIG. 25 is a bottom perspective view showing a magazine structure of the conventional case.
Figure 26:
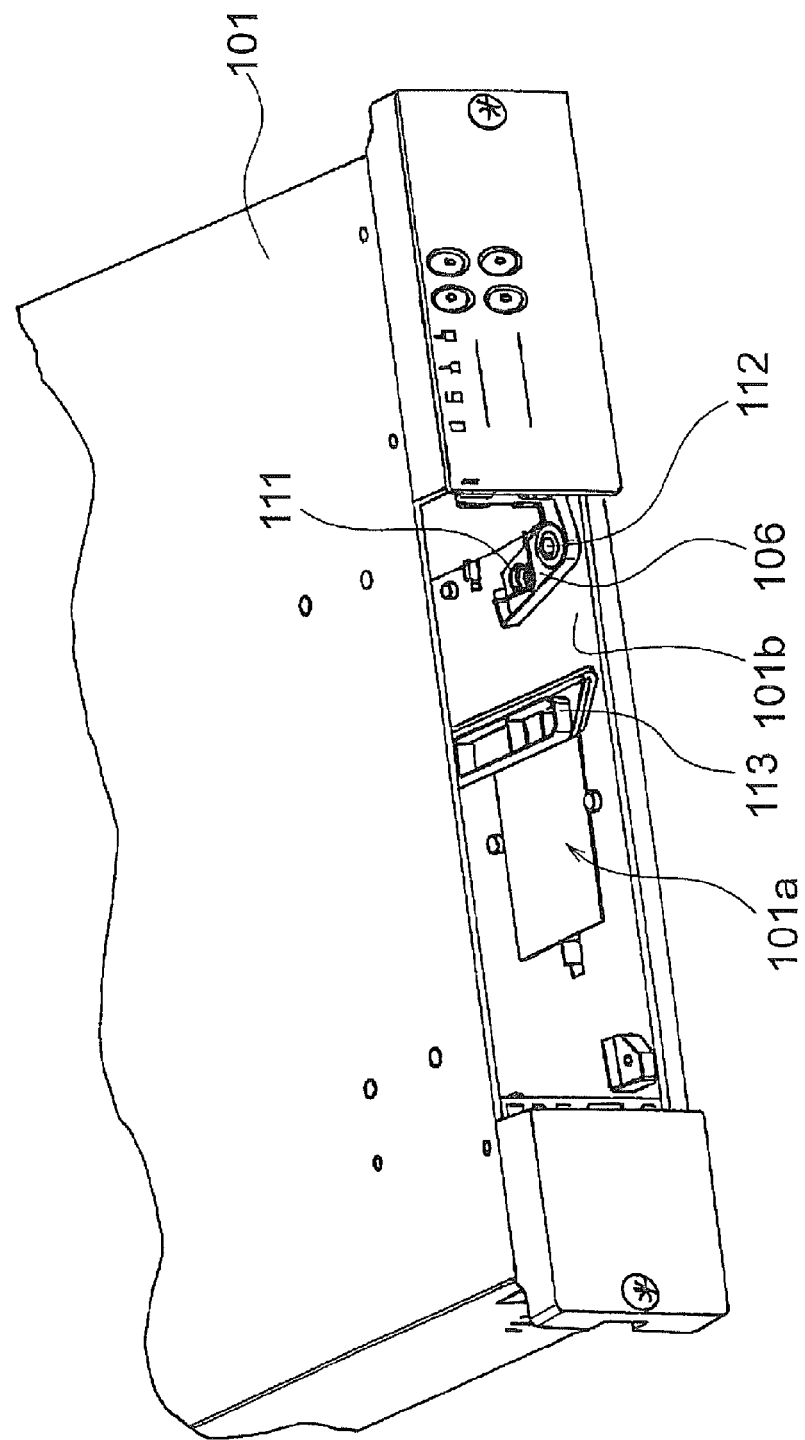
FIG. 26 is a perspective view showing the structure in the vicinity of a magazine housing section of the conventional case.
Figure 27A:
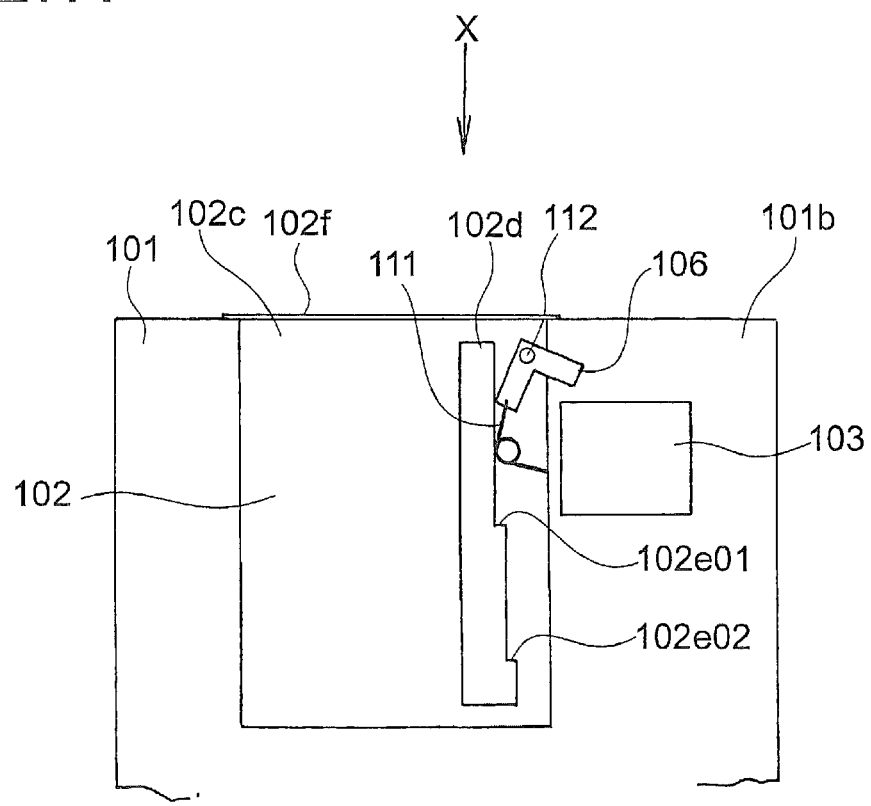
FIG. 27A is a top schematic view showing a magazine extraction restriction release operation of the conventional case.
Figure 27B:
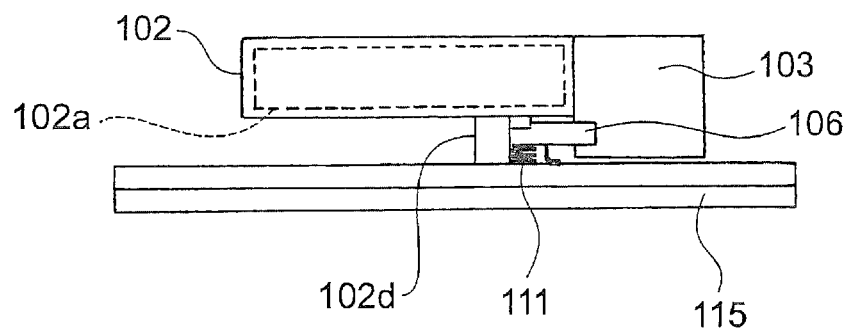
FIG. 27B is a perspective view taken along an arrow X of FIG. 27A.
Figure 28:
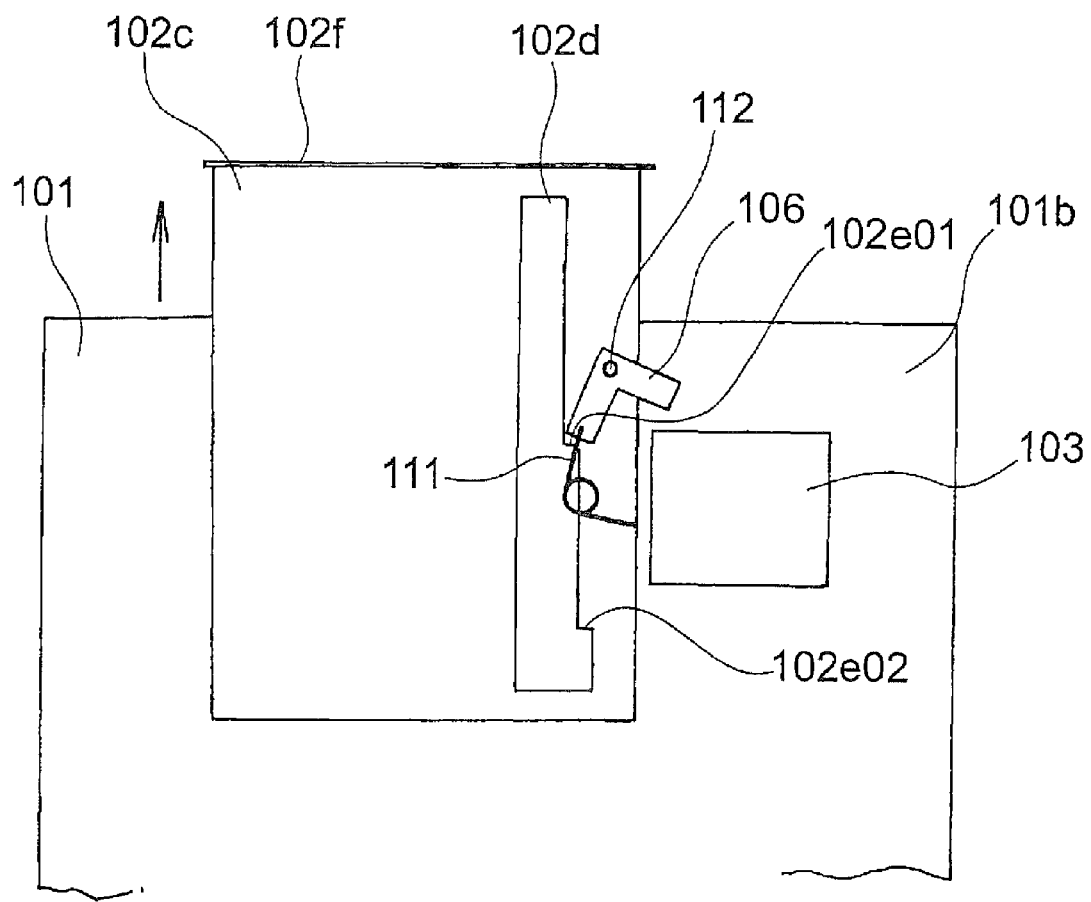
FIG. 28 is an illustration showing the magazine extraction restriction release operation of the conventional case.
Figure 29:
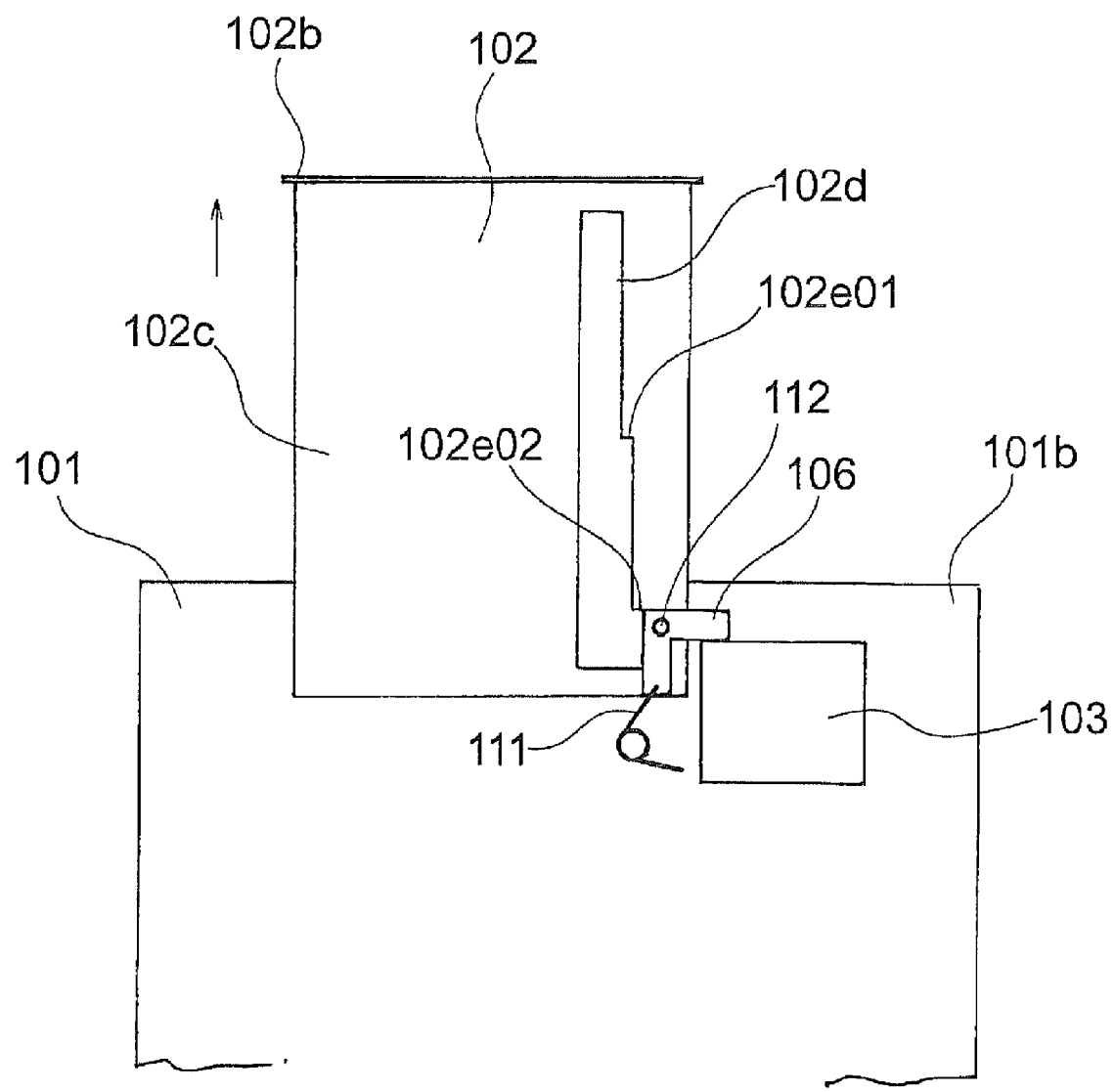
FIG. 29 is an illustration showing the magazine extraction restriction release operation of the conventional case.

The block sections 26A and 48c of each of the exemplary embodiments formed in a bifurcated manner may be formed as a block section 56A in a shape with which only the single cell 12A on the lower most stage is blocked and the cells 12A, 12A on the middle stage and the higher most stage are in a state capable of exchanging the cartridge 14 as shown in FIG. 23 when the magazine 12 is in the mailslot position. In this case, the cartridges 14 in the two cells 12A are the specific cartridges.

With this, it is also possible to acquire the effects substantially same as those described in (1) to (6).

Further, the shapes of the block section 26A, the block section 48c, and the block section 56A of each of the exemplary embodiments may be changed into a shape for blocking only the call 12A on the higher most stage, a shape for blocking the cells 12A, 12A on the higher most stage and the middle stage, or a shape for blocking the cell 12A on the higher most stage and the cell 12A on the lower most stage.

The whole or part of the exemplary embodiments disclosed above can be described as, but not limited to, the following Supplementary Notes.

(Supplementary Note 1)

A magnetic tape library device which includes:
a magazine which houses a magnetic tape cartridge inside thereof via a cell;
a device main body which houses the magazine in a freely movable manner within a same plane along an inserting/extracting direction; and
an accessor provided on one side of the device main body along the inserting/extracting direction, which transports the magnetic tape cartridge extracted from the magazine along the inserting/extracting direction and towards a magnetic tape drive, wherein:
a plurality of the cells are provided inside the magazine in a plurality of rows along the inserting/extracting and on a plurality of stages in a height direction in a stacked manner; and
a cartridge exchange number restricting mechanism is provided for restricting the magnetic tape cartridges from being ejected out from remaining cells except for the cell where at least a specific magnetic tape cartridge is housed out of the plurality of cells under a state where the magazine is being drawn out so that the plurality of cells on a front-side drawer end part in the inserting/extracting direction out of the plurality of cells are outside of the device main body.

(Supplementary Note 2)

The magnetic tape library device as depicted in Supplementary Note 1, wherein:
a part of the cartridge exchange number restricting mechanism is provided in the magazine; and
the cartridge exchange number restricting mechanism includes a block section which blocks ejection of the cartridges housed in the cells, and an interlocker which holds the block section at one end part and operates in an interconnection manner when the magazine is drawn out.

(Supplementary Note 3)

The magnetic tape library device as depicted in Supplementary Note 1 or 2, wherein
the interlocker includes: a sliding member provided to the front-side end part in the inserting/extracting direction of the magazine, one end part thereof in a length direction being attached to a bottom face part of the magazine via an attaching pin member, and other end part being able to slide by the attaching pin member; and a rocking member provided to a bottom face of the sliding member in an integrated manner with the sliding member in T-shape on a plane, which is displaced in a direction that is orthogonal to the inserting/extracting direction when the magazine is drawn out, and
the block section is provided to the other end part of the sliding member.

(Supplementary Note 4)

The magnetic tape library device as depicted in any one of Supplementary Notes 1 to 3, wherein:
an interlocker driving mechanism which constitutes the cartridge exchange number restricting mechanism and drives the interlocker is provided to the device main body; and
the interlocker driving mechanism is constituted with an engaging member which enables a top-end projection part formed in one end of the rocking member to be displaced when engaged with the top-end projection part by having the attaching pin member as a rotation center.

(Supplementary Note 5)

The magnetic tape library device as depicted in Supplementary Note 1 or 2, wherein the interlocker is constituted with:

a slide member provided to the front-side end part of the inserting/extracting direction of the magazine, both ends in the length direction being supported, respectively, by attaching pin members provided on the bottom face part of the magazine to be slidable in the length direction;

an energizing member provided in a center part of the slide member in the length direction, which energizes the slide member constantly to one side of sliding directions;

a block section forming member provided on one end of the slide member in the length direction, which enables the block section to frequent along the inserting/extracting direction in association with sliding movements of the slide member in the length direction; and the rocking member provided to a bottom face of the slide member in an integrated manner with the slide member in T-shape on a plane, which is displaced in a direction that is orthogonal to the inserting/extracting direction by resisting the energizing member when the magazine is drawn out.

(Supplementary Note 6)

The magnetic tape library device as depicted in Supplementary Note 5, wherein:

the interlocker driving mechanism for driving the interlocker is provided in the device main body; and the interlocker driving mechanism is constituted with an engaging member which enables a top-end projection part formed in one end of the rocking member to be displaced to the block section side when engaged with the top-end projection part.

Industrial Applicability

The present invention can be utilized when constructing the magnetic tape library device which can reduces the excessive speed of the magazine when inserting the magazine that houses multiple numbers of magnetic tape cartridges inside thereof in a detachable manner to the device main body or when extracting the magazine from the device main body, can secure the safety of the operations, and can prevent damaging of the devices.

What is claimed is:

1. A magnetic tape library device, comprising:

a magazine which houses a magnetic tape cartridge inside thereof via a cell;

a device main body which houses the magazine in a freely movable manner within a same plane along an inserting/extracting direction; and an accessor provided on one side of the device main body along the inserting/extracting direction, which transports the magnetic tape cartridge extracted from the magazine along the inserting/extracting direction and towards a magnetic tape drive, wherein:

a plurality of the cells are provided inside the magazine in a plurality of rows along the inserting/extracting direction and on a plurality of stages in a height direction in a stacked manner; and a cartridge exchange number restricting mechanism is provided for restricting the magnetic tape cartridges from being ejected out from remaining cells except for the cell where at least a specific magnetic tape cartridge is housed out of the plurality of cells under a state where the magazine is being drawn out so that the plurality of cells on a front-side drawer end part in the inserting/extracting direction out of the plurality of cells are outside of the device main body.

2. The magnetic tape library device as claimed in claim 1, wherein:

a part of the cartridge exchange number restricting mechanism is provided in the magazine; and the cartridge exchange number restricting mechanism comprises a block section which blocks ejection of the cartridges housed in the cells, and an interlocker which holds the block section at one end part and operates in an interconnection manner when the magazine is drawn out.

3. The magnetic tape library device as claimed in claim 2, wherein:

an interlocker driving mechanism which constitutes the cartridge exchange number restricting mechanism and drives the interlocker is provided to the device main body; and the interlocker driving mechanism is constituted with an engaging member which enables a top-end projection part formed in one end of the rocking member to be displaced when engaged with the top-end projection part by having the attaching pin member as a rotation center.

4. The magnetic tape library device as claimed in claim 1, wherein the interlocker comprises: a sliding member provided to the front-side end part in the inserting/extracting direction of the magazine, one end part thereof in a length direction being attached to a bottom face part of the magazine via an attaching pin member, and other end part being able to slide by the attaching pin member; and a rocking member provided to a bottom face of the sliding member in an integrated manner with the sliding member in T-shape on a plane, which is displaced in a direction that is orthogonal to the inserting/extracting direction when the magazine is drawn out, and the block section is provided to the other end part of the sliding member.

5. The magnetic tape library device as claimed in claim 1, wherein the interlocker is constituted with:

a slide member provided to the front-side end part of the inserting/extracting direction of the magazine, both ends in the length direction being supported, respectively, by attaching pin members provided on the bottom face part of the magazine to be slidable in the length direction;

an energizing member provided in a center part of the slide member in the length direction, which energizes the slide member constantly to one side of sliding directions;

a block section forming member provided on one end of the slide member in the length direction, which enables the block section to frequent along the inserting/extracting direction in association with sliding movements of the slide member in the length direction; and the rocking member provided to a bottom face of the slide member in an integrated manner with the slide member in T-shape on a plane, which is displaced in a direction that is orthogonal to the inserting/extracting direction by resisting the energizing member when the magazine is drawn out.

6. The magnetic tape library device as claimed in claim 5, wherein:

the interlocker driving mechanism for driving the interlocker is provided in the device main body; and the interlocker driving mechanism is constituted with an engaging member which enables a top-end projection part formed in one end of the rocking member to be displaced to the block section, side when engaged with the top-end projection part.

7. A magnetic tape library device, comprising:

a magazine which houses a magnetic tape cartridge inside thereof via a cell;

a device main body which houses the magazine in a freely movable manner within a same plane along an inserting/extracting direction; and accessor means provided on one side of the device main body along the inserting/extracting direction, for transporting the magnetic tape cartridge extracted from the magazine along the inserting/extracting direction and towards a magnetic tape drive, wherein:

a plurality of the cells are provided inside the magazine in a plurality of rows along the inserting/extracting direction and on a plurality of stages in a height direction in a stacked manner; and cartridge exchange number restricting means is provided for restricting the magnetic tape cartridges from being ejected out from remaining cells except for the cell where at least a specific magnetic tape cartridge is housed out of the plurality of cells under a state where the magazine is being drawn out so that the plurality of cells on a front-side drawer end part in the inserting/extracting direction out of the plurality of cells are outside of the device main body.

* * * * *